United States Patent
Ithal et al.

(10) Patent No.: US 12,166,775 B2
(45) Date of Patent: *Dec. 10, 2024

(54) GRAPHICAL QUERY BUILDER FOR CLOUD DATA ATTACK DETECTION

(71) Applicant: Normalyze, Inc., Los Altos, CA (US)

(72) Inventors: Ravishankar Ganesh Ithal, Los Altos, CA (US); Mummoorthy Murugesan, Fremont, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,101

(22) Filed: Mar. 15, 2023

(65) Prior Publication Data

US 2023/0231868 A1    Jul. 20, 2023

Related U.S. Application Data

(63) Continuation of application No. 17/939,489, filed on Sep. 7, 2022, now Pat. No. 11,625,499.
(Continued)

(51) Int. Cl.
*H04L 9/40* (2022.01)
*G06F 9/451* (2018.01)
(Continued)

(52) U.S. Cl.
CPC .......... *H04L 63/1416* (2013.01); *G06F 9/451* (2018.02); *G06F 16/211* (2019.01);
(Continued)

(58) Field of Classification Search
CPC .............. G06F 21/6227; G06F 21/577; G06F 2221/034; G06F 2221/2141
See application file for complete search history.

(56) References Cited

U.S. PATENT DOCUMENTS 8,190,850 B1    5/2012    Davenport et al.
8,392,997 B2    3/2013    Chen
(Continued)

FOREIGN PATENT DOCUMENTS

WO    2017049439 A1    3/2017

OTHER PUBLICATIONS

Anonymous, Amazon Neptune features, Amazon Neptune, retrieved on Aug. 15, 2022, 9 pages. Retrieved from the internet [URL: https://aws.amazon.com/neptune/features/ ].
(Continued)

*Primary Examiner* — Meng Li
(74) *Attorney, Agent, or Firm* — Flagship Patents; Sikander M. Khan; Chris Volkmann

(57) ABSTRACT

The technology disclosed relates to streamlined analysis of security posture of a cloud environment. In particular, the disclosed technology relates to a graphical query builder for generating a subject path signature, for example representing a vulnerability path in the cloud environment. A computer-implemented method includes generating a graphical user interface having configurable node elements and edge elements and, in response to user input on the graphical user interface, configuring the node elements to represent entities in a subject path signature in the cloud environment and the edge elements to represent relationships between the entities in the subject path signature. The method also includes generating a query representing the subject path signature, executing the query to qualify a set of network paths in the cloud environment as conforming to the subject path signature, and outputting query results identifying the qualified set of network paths.

19 Claims, 35 Drawing Sheets

US 12,166,775 B2
Page 2

Related U.S. Application Data

(60) Provisional application No. 63/246,313, filed on Sep. 21, 2021, provisional application No. 63/246,315, filed on Sep. 21, 2021, provisional application No. 63/246,310, filed on Sep. 21, 2021, provisional application No. 63/246,303, filed on Sep. 20, 2021.

(51) Int. Cl.
*G06F 16/21* (2019.01)
*G06F 16/245* (2019.01)
*G06F 16/35* (2019.01)
*G06F 16/95* (2019.01)
*G06F 21/57* (2013.01)
*G06F 21/62* (2013.01)

(52) U.S. Cl.
CPC ...... *G06F 16/24569* (2019.01); *G06F 16/355* (2019.01); *G06F 16/95* (2019.01); *G06F 21/577* (2013.01); *G06F 21/6227* (2013.01); *H04L 63/083* (2013.01); *H04L 63/102* (2013.01); *H04L 63/104* (2013.01); *H04L 63/1433* (2013.01); *H04L 63/18* (2013.01); *H04L 63/205* (2013.01); *G06F 2221/034* (2013.01); *G06F 2221/2141* (2013.01)

(56) References Cited

U.S. PATENT DOCUMENTS

| | | | |
|---|---|---|---|
| 8,402,514 B1 | 3/2013 | Thompson | |
| 8,578,442 B1 | 11/2013 | Banerjee | |
| 8,689,324 B2 | 4/2014 | Bowman | |
| 9,092,500 B2 | 7/2015 | Varadharajan et al. | |
| 9,910,881 B1 | 3/2018 | Brooker | |
| 10,032,450 B2* | 7/2018 | Olmstead | G10L 15/22 |
| 10,609,044 B2 | 3/2020 | Andow | |
| 11,108,828 B1* | 8/2021 | Curtis | H04L 63/20 |
| 11,256,661 B1* | 2/2022 | Gassner | G06F 21/6227 |
| 11,271,929 B1* | 3/2022 | McFarland | H04W 12/08 |
| 11,283,809 B2 | 3/2022 | Bogdanich Espina | |
| 11,374,982 B1* | 6/2022 | Keren | G06F 21/577 |
| 11,422,871 B1 | 8/2022 | Mounirou et al. | |
| 11,461,183 B2 | 10/2022 | Govindan | |
| 11,477,183 B1 | 10/2022 | Brandwine et al. | |
| 2004/0034794 A1 | 2/2004 | Mayer | |
| 2006/0236408 A1 | 10/2006 | Yan | |
| 2006/0242704 A1* | 10/2006 | Aviani | G06F 21/554 |
| | | | 726/25 |
| 2007/0180498 A1 | 8/2007 | Choudhary | |
| 2007/0185875 A1 | 8/2007 | Chang | |
| 2007/0226796 A1* | 9/2007 | Gilbert | G06F 21/577 |
| | | | 726/25 |
| 2008/0104244 A1 | 5/2008 | Chen | |
| 2008/0288330 A1 | 11/2008 | Hildebrand | |
| 2012/0209997 A1 | 8/2012 | Duan | |
| 2012/0210419 A1 | 8/2012 | Choudhary | |
| 2014/0068718 A1* | 3/2014 | Mureinik | G06F 21/53 |
| | | | 726/4 |
| 2014/0201642 A1* | 7/2014 | Vicat-Blanc | H04L 41/122 |
| | | | 715/736 |
| 2015/0347683 A1 | 12/2015 | Ansari et al. | |
| 2016/0366183 A1 | 12/2016 | Smith | |
| 2017/0063899 A1 | 3/2017 | Muddu | |
| 2017/0078322 A1* | 3/2017 | Seiver | H04L 63/1433 |
| 2017/0083837 A1* | 3/2017 | Berlandier | G06F 16/24564 |
| 2017/0155672 A1 | 6/2017 | Muthukrishnan | |
| 2017/0208151 A1 | 7/2017 | Gil | |
| 2017/0299633 A1 | 10/2017 | Pietrowicz | |
| 2018/0232528 A1 | 8/2018 | Williamson et al. | |
| 2019/0228186 A1 | 7/2019 | Atreya et al. | |
| 2019/0243865 A1* | 8/2019 | Rausch | G06F 16/907 |
| 2020/0007455 A1 | 1/2020 | Chhabra et al. | |
| 2020/0057864 A1 | 2/2020 | Parthasarathy | |
| 2020/0067962 A1* | 2/2020 | Tan | H04L 63/1433 |
| 2020/0134076 A1* | 4/2020 | Ogrinz | G06F 7/14 |
| 2020/0186515 A1 | 6/2020 | Bansal | |
| 2020/0213357 A1 | 7/2020 | Levin et al. | |
| 2020/0272740 A1* | 8/2020 | Obee | G06F 21/577 |
| 2020/0396222 A1 | 12/2020 | Gargaro | |
| 2020/0401696 A1* | 12/2020 | Ringlein | G06F 21/552 |
| 2021/0014265 A1* | 1/2021 | Hadar | G06F 21/577 |
| 2021/0084048 A1 | 3/2021 | Kannan | |
| 2021/0089353 A1 | 3/2021 | Shear | |
| 2021/0089422 A1 | 3/2021 | Kim | |
| 2021/0182607 A1 | 6/2021 | Agarwal | |
| 2021/0243190 A1 | 8/2021 | Bargury et al. | |
| 2021/0243208 A1 | 8/2021 | Rubin | |
| 2021/0271565 A1 | 9/2021 | Bhavanarushi et al. | |
| 2021/0326314 A1* | 10/2021 | Weber | G06F 3/04847 |
| 2021/0336934 A1 | 10/2021 | Deshmukh et al. | |
| 2021/0392142 A1 | 12/2021 | Stephens et al. | |
| 2022/0021652 A1 | 1/2022 | Moghe | |
| 2022/0094614 A1* | 3/2022 | Khurshid | H04L 41/147 |
| 2022/0094643 A1* | 3/2022 | Cook | H04L 47/783 |
| 2022/0116455 A1* | 4/2022 | Raghunath | H04L 47/83 |
| 2022/0198015 A1 | 6/2022 | Webster | |
| 2022/0200869 A1 | 6/2022 | Erlingsson | |
| 2022/0245175 A1 | 8/2022 | Hawco et al. | |
| 2022/0292002 A1 | 9/2022 | Kumar et al. | |
| 2022/0335151 A1 | 10/2022 | Stephen et al. | |

OTHER PUBLICATIONS

Anonymous, Assign Azure roles using the Azure portal, Microsoft, dated Dec. 29, 2021, 12 pages. Retrieved on Aug. 16, 2022. Retrieved from the internet [URL: https://docs.microsoft.com/en-us/azure/role-based-access-control/role-assignments-portal?tabs=current].

Anonymous, Choose predefined roles, Google Cloud IAM, retrieved on Aug. 15, 2022, 6 pages. Retrieved from the interent [URL: https://cloud.google.com/iam/docs/choose-predefined-roles].

Anonymous, Install the AWS Security Hub App and view the Dashboards, sumo logic, retrieved on Aug. 15, 2022, 6 pages. Retrieved from the internet [URL: https://help.sumologic.com/07Sumo-Logic-Apps/01Amazon_and_AWS/AWS_Security_Hub/3-Install_the_AWS_Security_Hub_App_and_view_the_Dashboards ].

Anonymous, Policies and permission in IAM, Amazon AWS, retrieved on Aug. 15, 2022, 16 pages. Retrieved from he Internet [URL: https://docs.aws.amazon.com/IAM/latest/UserGuide/access_policies.html].

Anonymous, Policy Evaluation Logic, Amazon AWS User Guide, retrieved on Aug. 15, 2022, 19 pages. Retrieved from the internet [URL: https://docs.aws.amazon.com/IAM/latesl/UserGuide/reference_policies_evaluation-logic.html].

Anonymous, Understanding roles, Google Cloud, retrieved on Aug. 15, 2022, 5 pages. Retrieved from the internet URL: https://cloud.google.com/iam/docs/understanding-roles].

Anonymous, What is Azure role-based access control (Azure RBAC)?, Microsoft, dated Jun. 27, 2022, 12 pages. Retrieved on Aug. 16, 2022. Retrieved from the internet [URL: https://docs.microsoft.com/en-us/azure/role-based-access-control/overview].

Anthony, Mastering AWS Security—Create and maintain a secure cloud ecosystem, Packt, dated Oct. 2017, 247 pages.

Broadcom, Symantec Cloud Workload Protection for Storage, retrieved on Aug. 15, 2022, 4 pages. Retrieved from he internet [URL: https://techdocs.broadcom.com/us/en/symantec --security-software/endpoint-security-and-management/cloud-workload-protection-for-storage/1-0.hlml?locale=EN_US].

Jing et al., Discover sensitive data by using custom data identifiers with Amazon Macie, Amazon AWS, dated Aug. 26, 2020, 12 pages. Retrieved on Aug. 15, 2022. Retrieved from the internet [URL: https://aws.amazon.com/blogs/security/discover-sensitive-data-by-using-custom-data-identifiers-with-amazon-macie/].

Samaraweera et al., Security and Privacy Implications on Database Systems in Big Data Era: A Survey, IEEE Transactions on Knowledge and Data Engineering vol. 33, No. 1, dated Jul. 2019, 20 pages.

U.S. Appl. No. 17/858,903—Notice of Allowance, dated Sep. 28, 2022, 12 pages.

(56) References Cited

OTHER PUBLICATIONS

U.S. Appl. No. 17/858,907—Notice of Allowance, dated Dec. 1, 2022, 11 pages.
U.S. Appl. No. 17/858,914—Notice of Allowance, dated Dec. 2, 2022, 3 pages.
U.S. Appl. No. 17/858,914—Notice of Allowance, dated Nov. 21, 2022, 12 pages.
U.S. Appl. No. 17/858,919—Non-Final Office Action, dated Sep. 16, 2022, 34 pages.
U.S. Appl. No. 17/939,489—Notice of Allowance, dated Nov. 28, 2022, 13 pages.
U.S. Appl. No. 17/939,501—Non-Final Office Action, dated Dec. 1, 2022, 15 pages.
U.S. Appl. No. 17/939,522—Non-Final Office Action, dated Dec. 19, 2022, 15 pages.
Watson, Classify sensitive data in your environment using Amazon Macie, dated Apr. 4, 2018, Amazon AWS, 7 pages. Retrieved on Aug. 15, 2022. Retrieved from the internet [URL: https://aws.amazon.com/blogs/security/classify-sensitive-data-in-your-environment-using-amazon-macie/].
U.S. Appl. No. 17/939,501—Notice of Allowance, dated Mar. 7, 2023, 10 pages.

\* cited by examiner

| Accounts | | | | | Onboard Cloud Account |
|---|---|---|---|---|---|
| Search | | | | | |
| Display Name | Account Id | Data Store Count | Risk Count | Scan Status | Last Scan Completed At |
| ACME146 | 6655423 | 27 | 283 | Scanning | 11 minutes ago |
| SFD361 | 5511545 | 4 | 161 | Scanning | 30 minutes ago |
| KR584 | 1870205 | 9 | 186 | Complete | 32 minutes ago |

Home
Visualization
Risks
Inventory
Data
Assets
Packages
Identities
Data Scan
Profiles
Entities
Scan Settings
Risk Investigation
Risk Signatures
Query Builder
Automation
Settings
Accounts
Api Keys
Team Management
Integrations

FIG. 6

| Risk Signatures 578 | 580 | 582 | 584 | 586 | 588 | 590 | 592 |
|---|---|---|---|---|---|---|---|
| Search 🔍 | | | | | | | |
| Name ⇕ | Signature Id ⇕ | Description ⇕ | Result Header | Resource ⇕ | Tags | Likelihood Factor | Impact Factor |
| s3_bucket_mfa_deletion_not_enabled | 3017 | S3 Bucket's MFA delete is disabled | account_id \| account_name \| bucket_id +6 | bucket_arn | aws \| s3 | 7 | |
| s3_bucket_not_enable_transfer_acceleration | 3022 | S3 Bucket's transfer acceleration is disabled | account_id \| account_name \| bucket_id +6 | bucket_arn | aws \| s3 \| configuration_check | 3 | |
| s3_bucket_granting_write_access_to_all_authenticated_users | 3026 | S3 Bucket's grants WRITE (Upload/Delete) access to all authenti... | account_id \| account_name \| bucket_id +6 | bucket_arn | aws \| s3 \| iam | 10 | |
| s3_bucket_server_side_encryption_not_enabled | 3013 | S3 Bucket's default encryption is not enabled | account_id \| account_name \| bucket_id +6 | bucket_arn | aws \| s3 \| GDPR | 7 | |
| s3_bucket_name_not_dns_compilant | 3012 | S3 Bucket's name is not DNS complaint | account_id \| account_name \| bucket_id +6 | bucket_arn | aws \| s3 | 3 | |
| s3_bucket_not_enable_object_lock | 3021 | S3 Bucket's object lock is not enabled | account_id \| account_name \| bucket_id +6 | bucket_arn | aws \| s3 | 3 | |
| iam_password_policy_with_minimal_length_less_than_14_having_access_to_sensitive_data | 2534 | IAM User's password policy does not require minimal length o... | account_id \| account_name \| bucket_id +8 | bucket_arn | aws \| iam | 10 | 10 |

1-30 of 230 items  < 1 2 3 4 5 ... 8 > 30 / page

| | | | | |
|---|---|---|---|---|
| AWS Account Name | EC2InstanceArn | AWSRoleArn | S3Bucket Anonymous access | EC2Instance Publicdpsname | EC2Instance Publicipaddress |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |
| default | arn:aws:ec2:us-east-2: 346789275689: instance/i-07dbsfe 642df206er | arn:aws:iam:: 346789275689: role/s3-access-ec2+new | false | ec2+3-261-8-367. us-east-2.compute. amazonaws.com | 3.261.8.367 |

Sidebar:
- Home
- Visualization
- Risks
- Inventory
  - Data
  - Assets
- Data Scan
  - Profiles
  - Entities
- Scan Settings
- Risk Investigation
- Risk Signatures
- Query Builder
- Automation
- Settings
  - Accounts
  - Team Management
- Integrations

Query Preview

Return Data Fields:
- A.name as AWSAccountName
- C.arn as AWSRoleArn
- D.anonymous_access as S3BucketAnonymous_access
- B.publicdnsname as EC2InstancePublicdnsname
- B.publicipaddress as EC2InstancePublicipaddress
- B.arn as EC2InstanceArn Query:
MATCH (A:AWSAccount)-[R1:RESOURCE]→(B:EC2Instance)-[R2:HAS_ROLE]→(C:AWSRole)-(R3:CAN_READ)→(D:S3Bucket)-WHERE B.exposed_internet=true RETURN A. name as AWSAccountName, B. arn as EC2InstanceArn, C. arn as AWSRoleArn, D. anonymous_access as S3BucketAnonymous_access, B.publicdnsname as EC2InstancePublicdnsname, B.publicipaddress as EC2InstancePublicipaddress

[Preview Query] [Clear Query]    [Execute Query]

FIG. 27

GRAPHICAL QUERY BUILDER FOR CLOUD DATA ATTACK DETECTION

CROSS-REFERENCE TO RELATED APPLICATIONS

The present application is a continuation of and claims priority of U.S. patent application Ser. No. 17/939,489, filed Sep. 7, 2022, which claims the benefit of U.S. provisional patent application Ser. Nos. 63/246,303, filed Sep. 20, 2021, 63/246,310, filed Sep. 21, 2021, 63/246,313, filed Sep. 21, 2021, and 63/246,315, filed Sep. 21, 2021; the contents of these applications are hereby incorporated by reference in their entirety. The present application is also related to U.S. patent application Ser. No. 17/858,903, filed Jul. 6, 2022, Ser. No. 17/858,907, filed Jul. 6, 2022, Ser. No. 17/858,914, filed Jul. 6, 2022, and Ser. No. 17/858,919, filed Jul. 6, 2022; the contents of these applications are hereby incorporated by reference in their entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), and/or cloud-native configuration management database (CMDB).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to streamlined analysis of security posture of a cloud environment. In particular, the disclosed technology relates to a graphical query builder for generating a subject path signature, for example representing a vulnerability path in the cloud environment. A computer-implemented method includes generating a graphical user interface having configurable node elements and edge elements and, in response to user input on the graphical user interface, configuring the node elements to represent entities in a subject path signature in the cloud environment and the edge elements to represent relationships between the entities in the subject path signature. The method also includes generating a query representing the subject path signature, executing the query to qualify a set of network paths in the cloud environment as conforming to the subject path signature, and outputting query results identifying the qualified set of network paths.

Example 1 is a computer-implemented method for analyzing security posture of a cloud environment, the method comprising:
  generating a graphical user interface having configurable node elements and edge elements;
  in response to user input on the graphical user interface, configuring the node elements to represent entities in a subject path signature in the cloud environment and the edge elements to represent relationships between the entities in the subject path signature;
  generating a query representing the subject path signature;
  executing the query to qualify a set of network paths in the cloud environment as conforming to the subject path signature; and
  outputting query results identifying the qualified set of network paths.

Example 2 is the computer-implemented method of any or all previous examples, wherein the subject path signature comprises a subject vulnerability signature in the cloud environment.

Example 3 is the computer-implemented method of any or all previous examples, wherein executing the query comprises executing the query to qualify one or more compute resources or storage resources as vulnerable to breach attack based on classification data conforming to the subject vulnerability signature.

Example 4 is the computer-implemented method of any or all previous examples, wherein outputting query results comprises generating a representation of propagation of breach attack along the network paths.

Example 5 is the computer-implemented method of any or all previous examples, wherein the node elements comprise configurable variables that define a type of network path for the subject path signature.

Example 6 is the computer-implemented method of any or all previous examples, and further comprising a set of return data fields that define properties of the entities to return in response to the query.

Example 7 is the computer-implemented method of any or all previous examples, and further comprising:
  a query preview display pane configured to display one or more of the set of return data.

Example 8 is the computer-implemented method of any or all previous examples, wherein the entities comprise one or more of:
cloud accounts, compute resources, storage resources, and roles.

Example 9 is the computer-implemented method of any or all previous examples, wherein each given node display element includes a filter mechanism configured to receive user input defining a filter criterion relative to the entity represented by the given node display element.

Example 10 is the computer-implemented method of any or all previous examples, wherein the relationships comprise at least one of permissions data or access control data, and the edge elements comprise visual links between the node elements on the graphical user interface.

Example 11 is a computing system comprising:
at least one processor; and
memory storing instructions executable by the at least one processor, wherein the instructions, when executed, cause the computing system to:
generate a graphical user interface having configurable node elements and edge elements;
in response to user input on the graphical user interface, configure the node elements to represent entities in a subject path signature in the cloud environment and the edge elements to represent relationships between the entities in the subject path signature;
generate a query representing the subject path signature;
execute the query to qualify a set of network paths in the cloud environment as conforming to the subject path signature; and
output query results identifying the qualified set of network paths.

Example 12 is the computing system of any or all previous examples, wherein the subject path signature comprises a subject vulnerability signature in the cloud environment.

Example 13 is the computing system of any or all previous examples, wherein the instructions, when executed, cause the computing system to execute the query to qualify one or more compute resources or storage resources as vulnerable to breach attack based on classification data conforming to the subject vulnerability signature.

Example 14 is the computing system of any or all previous examples, wherein the instructions, when executed, cause the computing system to generate a representation of propagation of breach attack along the network paths.

Example 15 is the computing system of any or all previous examples, wherein the node elements comprise configurable variables that define a type of network path for the subject path signature.

Example 16 is the computing system of any or all previous examples, wherein the instructions, when executed, cause the computing system to generate a set of return data fields that define properties of the entities to return in response to the query.

Example 17 is the computing system of any or all previous examples, wherein the instructions, when executed, cause the computing system to:
generate a query preview display pane configured to display one or more of the set of return data fields or the generated query.

Example 18 is the computing system of any or all previous examples, wherein the entities comprise one or more of:
cloud accounts, compute resources, storage resources, or roles; and
the relationships comprising at least one of permissions data or access control data.

Example 19 is the computing system of any or all previous examples, wherein each given node display element includes a filter mechanism configured to receive user input defining a filter criterion relative to the entity represented by the given node display element.

Example 20 is a computing system comprising:
memory storing permissions data and access control data for pairs of compute resources and storage resources in a cloud environment;
accumulation logic configured to trace network paths between the compute resources and the storage resources based on the permissions data and the access control data;
graphical user interface generator logic configured to:
generate a graphical user interface having configurable node elements and edge elements; and
in response to user input on the graphical user interface, configure the node elements to represent entities in a subject path signature in the cloud environment and the edge elements to represent relationships between the entities in the subject path signature;
query generator logic configured to generate a query representing the subject path signature; and
query execution logic configured to:
execute the query to qualify a set of network paths in the cloud environment as conforming to the subject path signature; and
output query results identifying the qualified set of network paths.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 6 illustrates one example of a user interface display representing on-boarded cloud accounts.

FIGS. 10-1, 10-2, 10-3, and 10-4 (collectively referred to as FIG. 10) provide a flow diagram illustrating an example operation for streamlined analysis of security posture.

FIG. 12 illustrates one example of a user interface display that displays a set of risk signatures.

FIG. 15 illustrates one example of a user interface display that graphically depicts breach likelihood and impact scores.

FIGS. 19-1 and 19-2 (collectively referred to as FIG. 19) illustrate a flow diagram of one example of generating a graphical query builder user interface.

FIGS. 20-28 illustrate examples of user interface displays.

DETAILED DESCRIPTION

Figure 1:
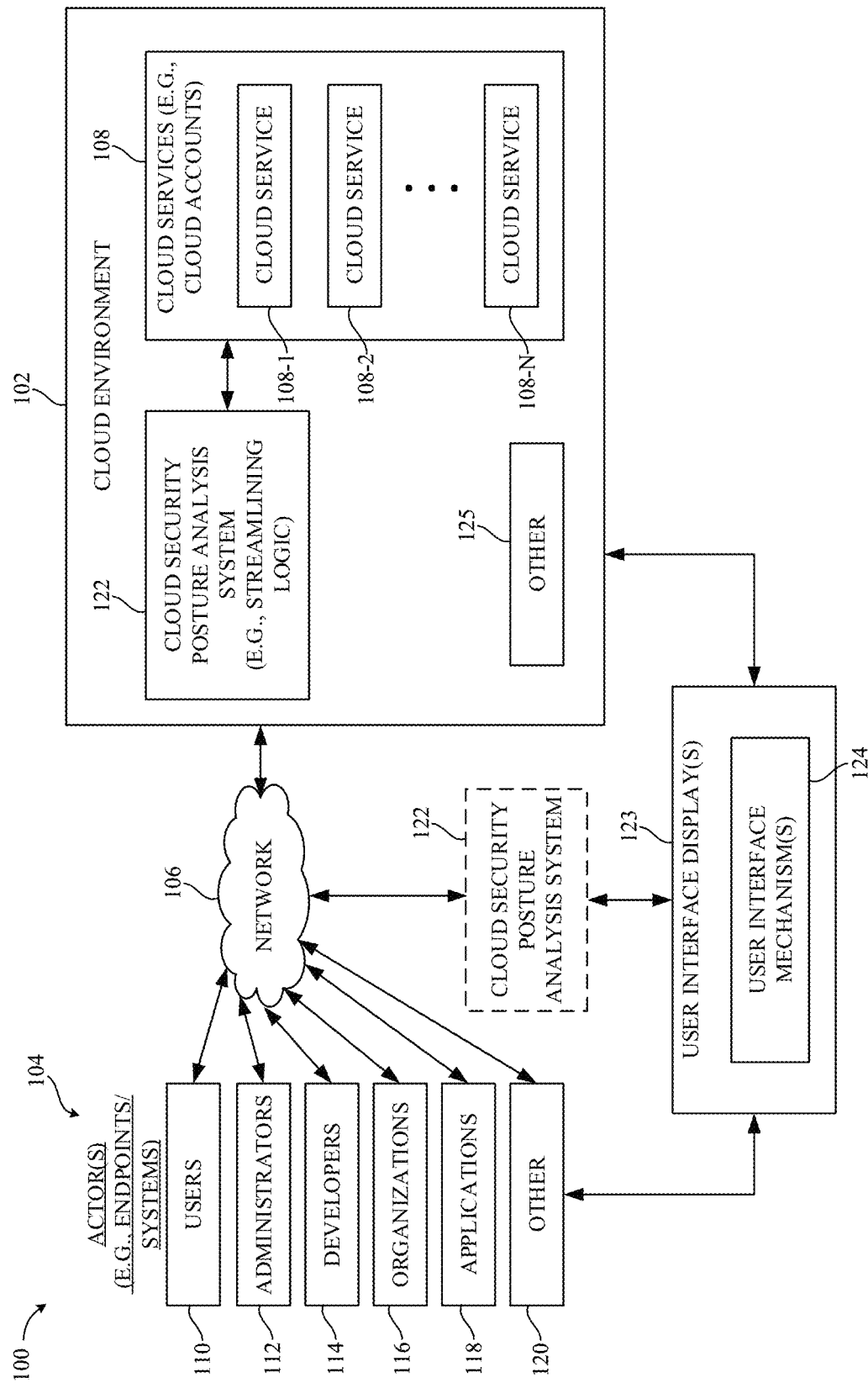
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present system is directed to a cloud security posture analysis system configured to analyze and take action on the security posture of a cloud account. The system discovers sensitive data among the cloud storage resources and discovers access patterns to the sensitive data. The results can be used to identify security vulnerabilities to understand the data security posture, detect and remediate the security vulnerabilities, and to prevent future breaches to sensitive data. The system provides real-time visibility and control on the control data infrastructure by discovering resources, sensitive data, and access paths, and tracking resource configuration, deep context and trust relationships in real-time as a graph or other visualization. It is noted that the technology disclosed herein can depict all graph embodiments in equivalent and analogous tabular formats or other visualization formats based on the data and logic disclosed herein.

The system can further score breach paths based on sensitivity, volume, and/or permissions to show an attack surface and perform constant time scanning, by deploying scanners locally within the cloud account. Thus, the scanners execute in the cloud service itself, with metadata being returned indicative of the analysis. Thus, in one example, an organization's cloud data does not leave the organization's cloud account. Rather, the data can be scanned in place and metadata sent for analysis by the cloud security posture analysis system, which further enhances data security.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
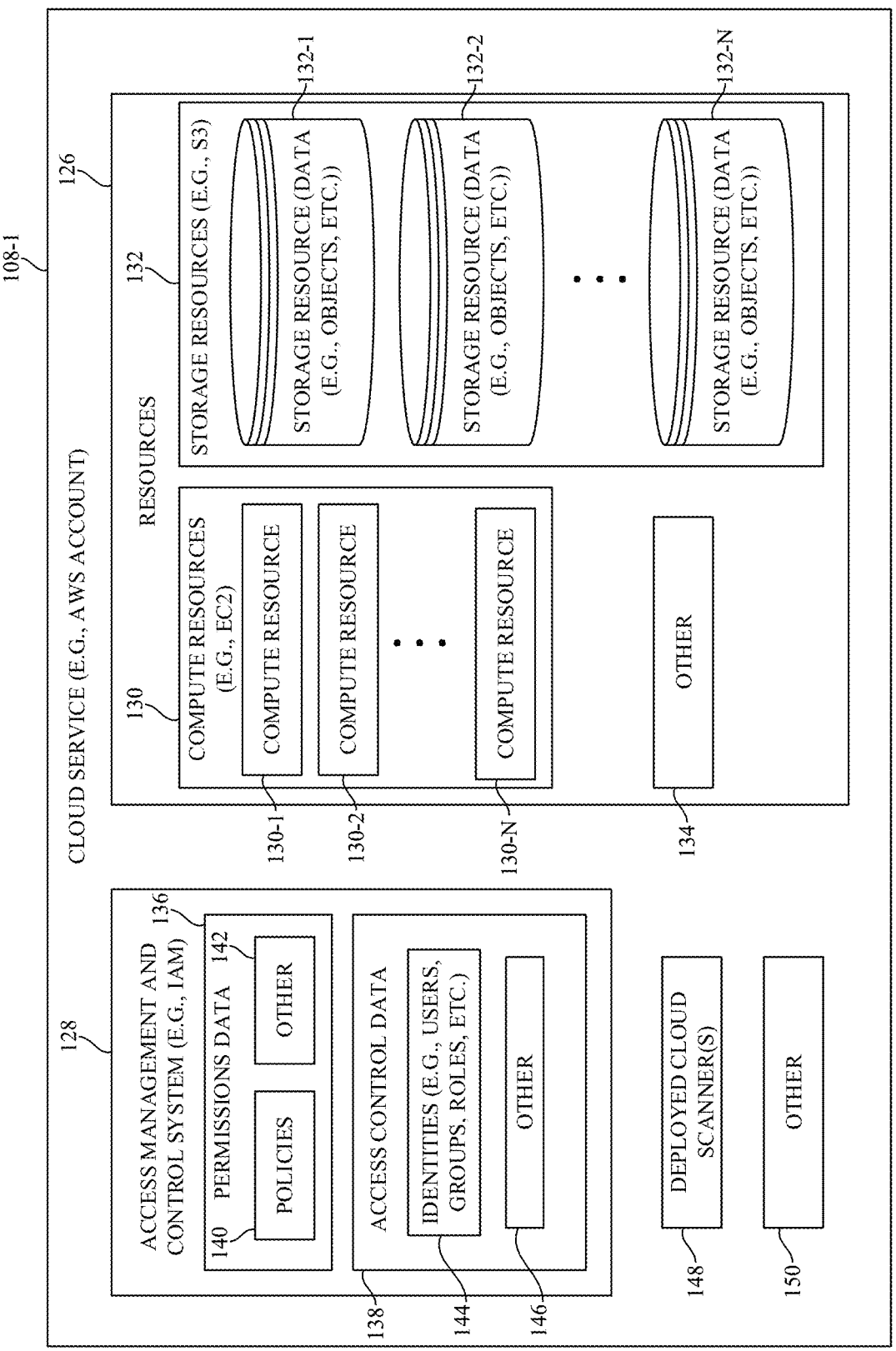
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, and can include other items 150 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc.), entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Figure 3:
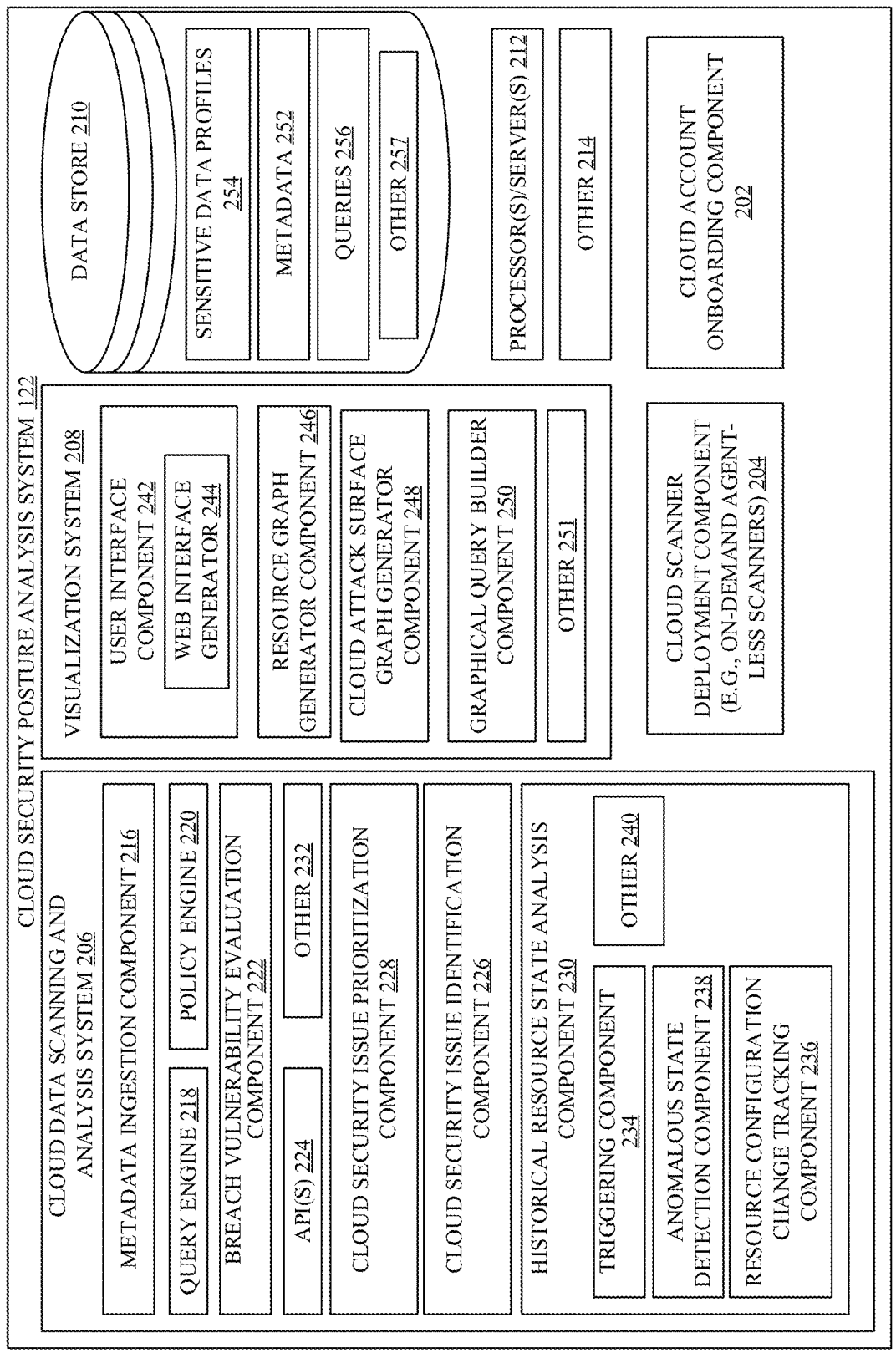
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include one or more processors or servers 212, and can include other items 214 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on the resources 126 and access management and control system 128 directly within the cloud service, and generate metadata that is returned to system 122. Thus, in one example, the actual cloud service data is not required to leave the cloud service for analysis. Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, historical resource state analysis component 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Historical resource state analysis component 230 is configured to analyze a history of states of resources 126. Component 230 includes a triggering component 234 configured to detect a trigger that to perform historical resource state analysis. Triggering component 234 is configured to identify an event that triggers component 230 to analyze the state of resources 126. The event can be, for example, a user input to selectively trigger the analysis, or a detected event such as the occurrence of a time period, an update to a resource, etc. Accordingly, historical resource state can be tracked automatically and/or in response to user input.

Component 230 includes a resource configuration change tracking component 236 configured to track changes in the configuration of resources 126. Component 230 also includes an anomalous state detection component 238, and can include other items 240 as well. Component 238 is configured to detect the occurrence of anomalous states in resources 126. A resource anomaly can be identified where a given resource has an unexpected state, such as a difference from other similar resources identified in the cloud service.

Visualization system 208 is configured to generate visualizations of the cloud security posture from system 206. Illustratively, system 208 includes a user interface component 242 configured to generate a user interface for a user, such as an administrator. In the illustrated example, component 242 includes a web interface generator 244 configured to generate web interfaces that can be displayed in a web browser on a client device.

Visualization system 208 also includes a resource graph generator component 246, a cloud attack surface graph generator component 248, a graphical query builder component 250, and can include other items 251 as well. Resource graph generator component 246 is configured to generate a graph or other representation of the relationships between resources 126. For example, component 246 can generate a cloud infrastructure map that graphically depicts pairs of compute resources and storage resources as nodes and network communication paths as edges between the nodes.

Cloud attack surface graph generator component 248 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

As discussed in further detail below, graphical query builder component 250 is configured to generate a graphical user interface with user input mechanisms configured to receive user inputs. Based on the user inputs, graphical query builder component 250 generates a query against the resource graphs generated by resource graph generator component 246. Briefly, an example query represents a subject path signature in the identified network communication paths between pairs of compute resources and storage resources which, for example, are identified based on permissions data and access control data.

Data store 210 stores the metadata 252 obtained by metadata ingestion component 216, sensitive data profiles 254, queries 256 generated by graphical query builder component 250, and can store other items 257 as well. Examples of sensitive data profiles are discussed in further detail below. Briefly, however, sensitive data profiles 254 can identify data patterns that are categorized as sensitive or meeting some predefined pattern of interest. Pattern matching can be performed based on the target data profiles. For example, pattern matching can be performed to identify social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Figure 4:
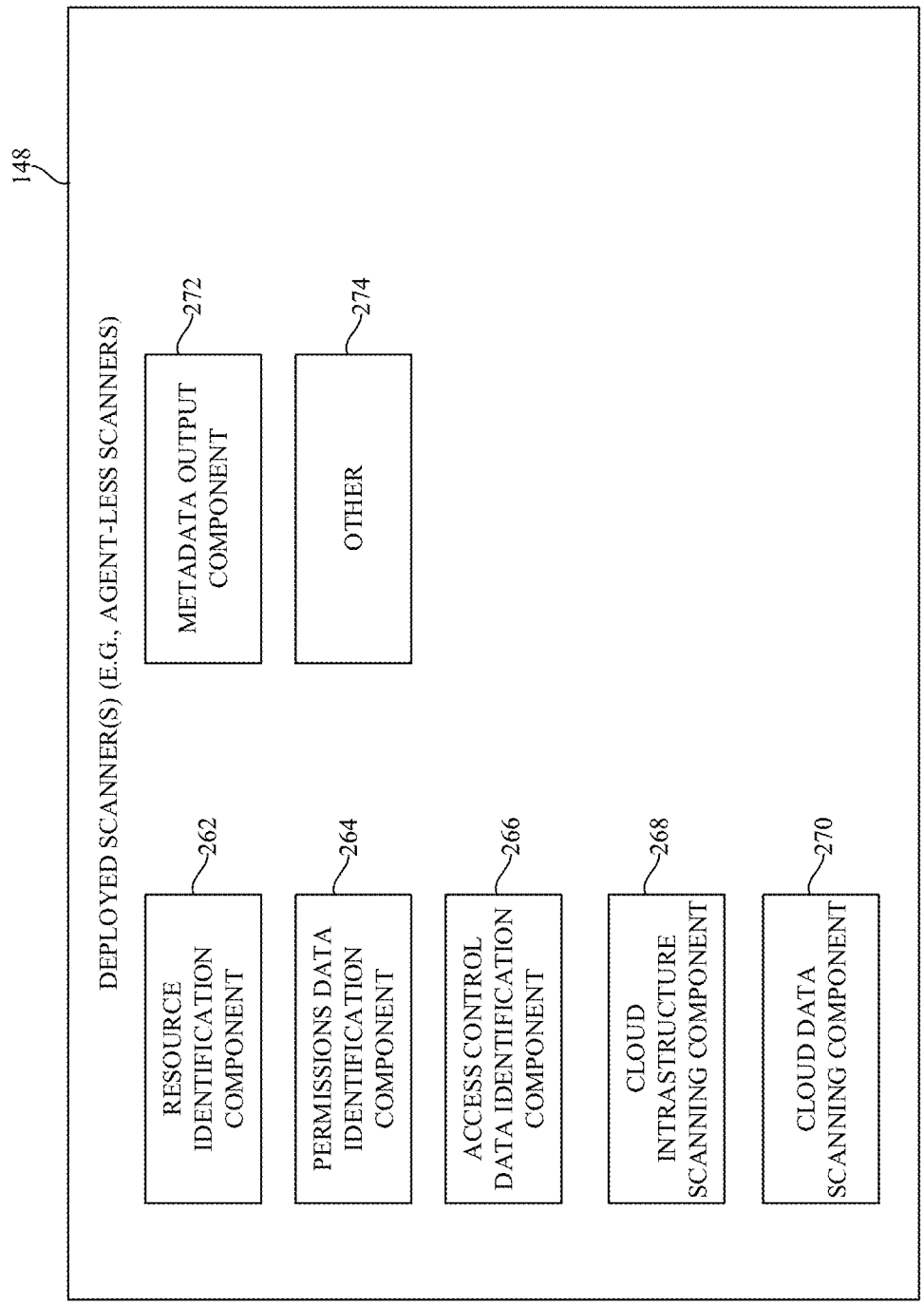
FIG. 4 is a block diagram illustrating one example of a deployed scanner.

FIG. 4 is a block diagram illustrating one example of a deployed scanner 148. Scanner 148 includes a resource identification component 262, a permissions data identification component 264, an access control data identification component 266, a cloud infrastructure scanning component 268, a cloud data scanning component 270, a metadata output component 272, and can include other items 274 as well.

Resource identification component 262 is configured to identify the resources 126 within cloud service 108-1 (and/or other cloud services 108) and to generate corresponding metadata that identifies these resources. Permissions data identification component 264 identifies the permissions data 136 and access control data identification component 266 identifies access control data 138. Cloud infrastructure scanning component 268 scans the infrastructure of cloud service 108 to identify the relationships between resources 130 and 132 and cloud data scanning component 270 scans the actual data stored in storage resources 132. The generated metadata is output by component 272 to cloud security posture analysis system 122.

Figure 5:
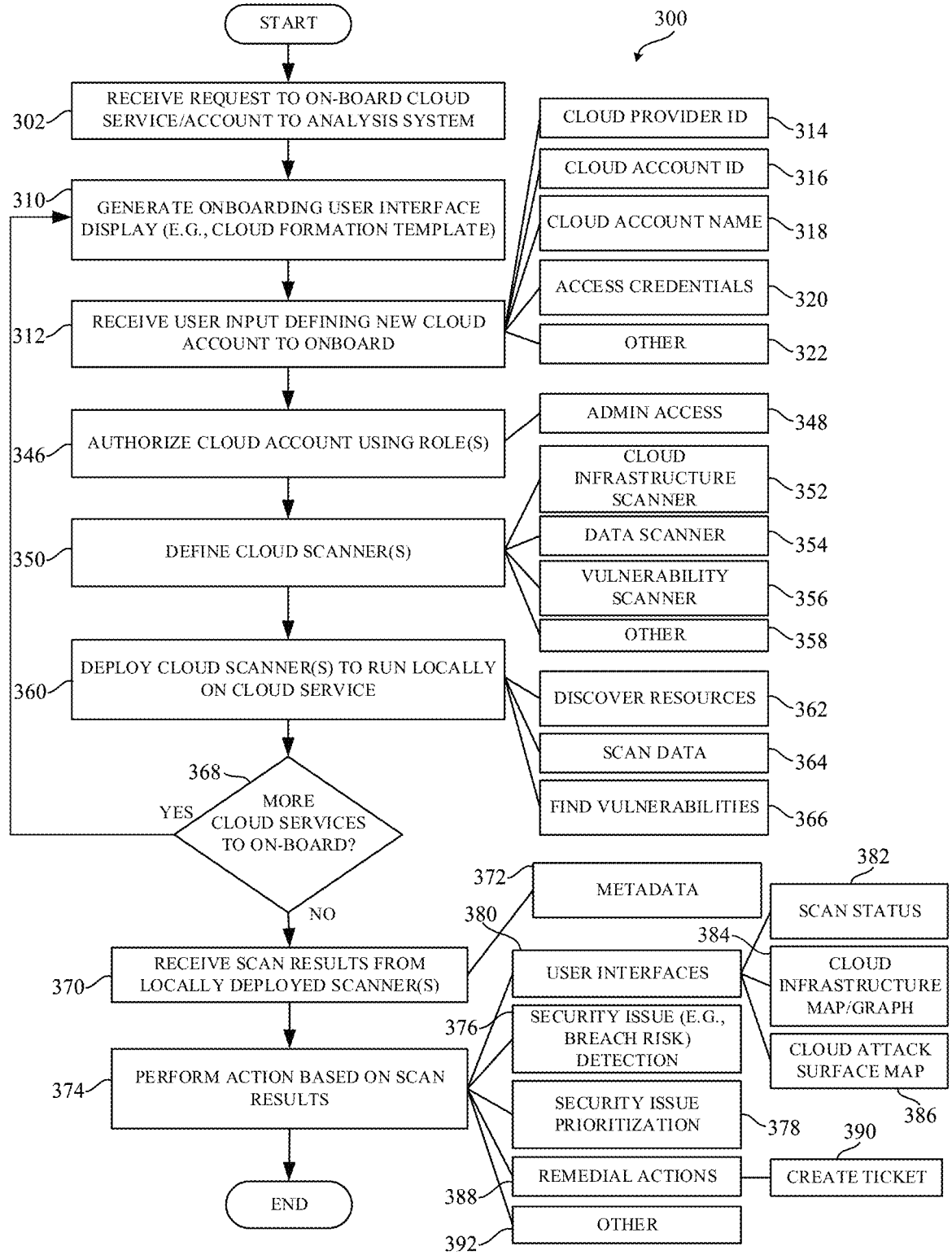
FIG. 5 is a flow diagram showing an example operation of on-boarding a cloud account and deploying one or more scanners.

FIG. 5 is a flow diagram 300 showing an example operation of system 122 in on-boarding a cloud account and deploying one or more scanners. At block 302, a request to on-board a cloud service to cloud security posture analysis system 122 is receives. For example, an administrator can submit a request to on-board cloud service 108-1.

FIG. 6 illustrates one example of a user interface display 304 provided for an administrator. Display 304 includes a display pane 306 including a number of display elements representing cloud accounts that have been on-boarded to system 122. Display 304 includes a user interface control 308 that can be actuated to submit an on-boarding request at block 302.

Referring again to FIG. 5, at block 310, an on-boarding user interface display is generated. At block 312, user input is received that defines a new cloud account to be on-boarded. The user input can define a cloud provider identification 314, a cloud account identification 316, a cloud account name 318, access credentials to the cloud account 320, and can include other input 322 defining the cloud account to be on-boarded.

Figure 7:
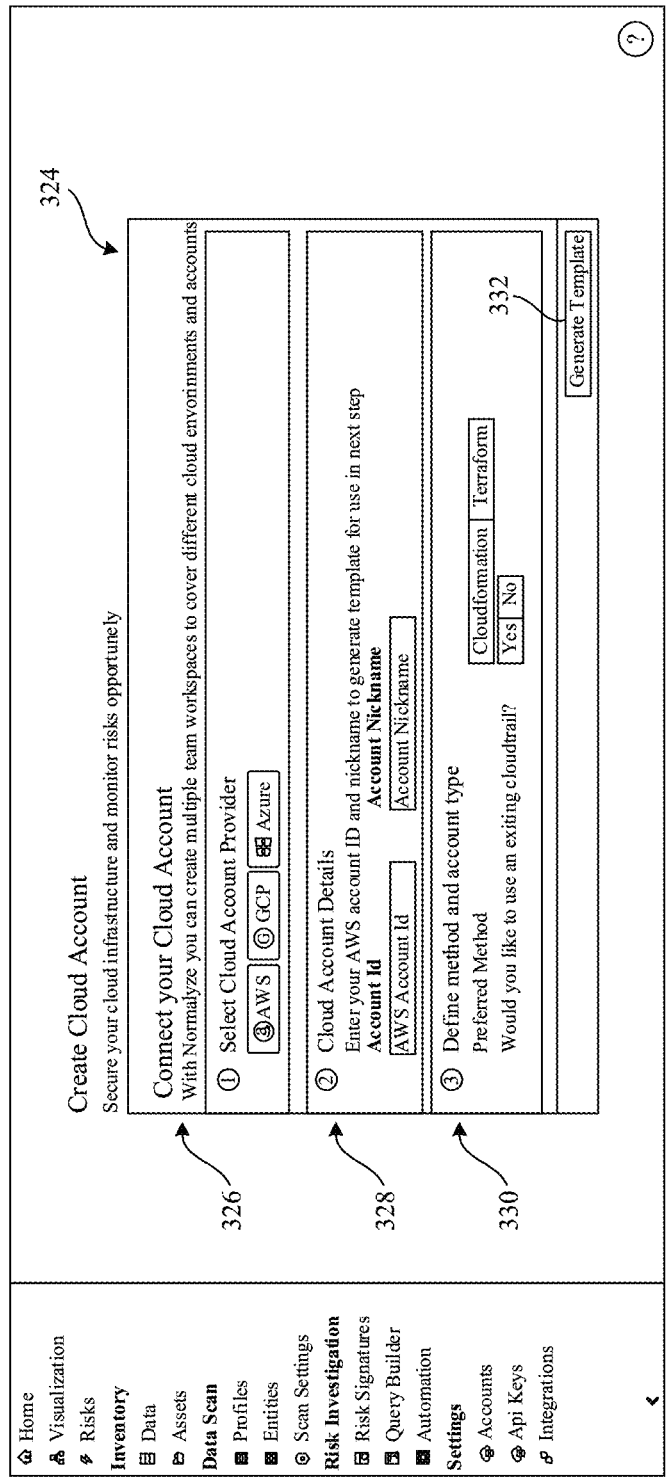
FIG. 7 illustrates one example of an on-boarding user interface display.

FIG. 7 illustrates one example of an on-boarding user interface display 324 that is displayed in response to user actuation of control 308.

Display 324 includes a user interface mechanism 326 configured to receive input to select or otherwise define a particular cloud account provider. In the illustrated example, mechanism 326 includes a plurality of selectable controls representing different cloud providers including, but not limited to, AWS, GCP, Azure.

Display 324 includes a user input mechanism 328 configured to receive input defining a cloud account identifier, and an account nickname. User input mechanisms 330 allow the user to define other parameters for the on-boarding. A user input mechanism 332 is actuated to generate a cloud formation template, or other template, to be used in the on-boarding process based on the selected cloud account provider.

Once the cloud account is connected to system 122, display 304 in FIG. 6 can be updated to show the details of the cloud account as well as the scan status. In FIG. 6, each entry includes a display name 334, an account ID 336, a data store count 338, and a risk count 340. Data store count 338 includes an indication of the number of data stores in the cloud account and the risk count 340 includes an indication of a number if identified security risks. A field 342 indicates the last scan status, such as whether the last scan has completed or whether the scanner is currently in progress or currently scanning. A field 344 indicates the time at which the last scan was completed.

Referring again to FIG. 5, at block 346, the cloud account is authorized using roles. For example, administrator access (block 348) can be defined for the cloud scanner using IAM roles. One or more cloud scanners are defined at block 350 and can include, but are not limited to, cloud infrastructure scanners 352, cloud data scanners 354, vulnerability scanners 356, or other scanners 358.

At block 360, the cloud scanners are deployed to run locally on the cloud service, such as illustrated in FIG. 2. The cloud scanners discover resources at block 362, scan data in the resources at block 364, and can find vulnerabilities at block 366. As discussed in further detail below, a vulnerability can identified based on finding a predefined risk signature in the cloud service resources. The risk signatures can be queried upon, and define expected behavior within the cloud service and locate anomalies based on this data.

At block 368, if more cloud services are to be on-boarded, operation returns to block 310. At block 370, the scan results from the deployed scanners are received. As noted above, the scan results include metadata (block 372) generated by the scanners running locally on the cloud service.

At block 374, one or more actions are performed based on the scan results. At block 376, the action includes security issue detection. For example, a breach risk on a particular resource (such as a storage resource storing sensitive data) is identified. At block 378, security issue prioritization can be performed to prioritize the detected security issues. Examples of security issue detection and prioritization are discussed in further detail below. Briefly, security issues can be detected by executing a query against the scan results using vulnerability or risk signatures. The risk signatures identify criterion such as accessibility of the resources, access and/or permissions between resources, and data types in accessed data stores. Further, each risk signature can be scored and prioritized based impact. For example, a risk signature can include weights indicative of likelihood of occurrence of a breach and impact if the breach occurs.

The action can further include providing user interfaces at block 380 that indicate the scan status (block 382), a cloud infrastructure representation (such as a map or graph) (block 384), and/or a cloud attack surface representation (map or graph) (block 386). The cloud attack surface representation can visualize vulnerabilities.

Remedial actions can be taken at block 388, such as creating a ticket (block 390) for a developer or other user to address the security issues. Of course, other actions can be taken at block 392. For instance, the system can make adjustments to cloud account settings/configurations to address/remedy the security issues.

Figure 8:
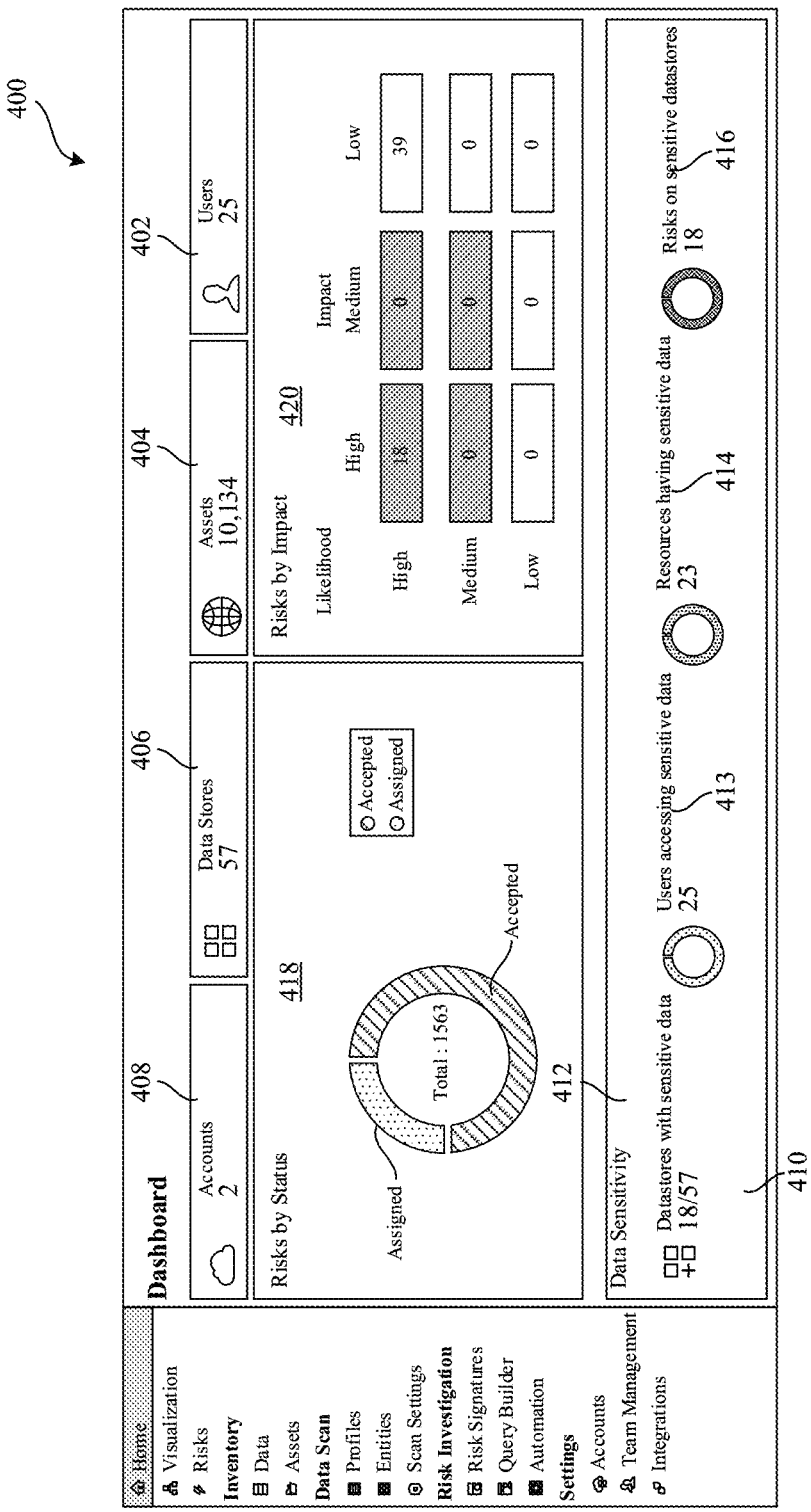
FIG. 8 illustrates one example of a user interface display having a dashboard representing on-boarded cloud service accounts.

FIG. 8 illustrates one example of a user interface display 400, that can be displayed at block 376. Display 400 provides a dashboard for a user which provides an overview of on-boarded cloud service accounts. The dashboard identifies a number of users 402, a number of assets 404, a number of data stores 406, and a number of accounts 408. A data sensitivity pane 410 includes a display element 412 that identifies a number of the data stores that include sensitive data, a display element 413 that identifies a number of users with access to the sensitive data, a display element 414 that identifies a number of resources having sensitive data, and a display element 416 that identifies a number of risks on the data stores having sensitive data. Further, graphs or charts can be generated to identify those risks based on factors such as status (display element 418) or impact (display element 420).

Display element 420 illustratively categorizes the risks based on impact as well as the likelihood of occurrence of those risks. Risk categorization is discussed in further detail below. Briefly, however, display element 420 stratifies one or more of breach likelihood scores or breach impact scores categories representing different levels of severity, such as high, medium, and low severity levels. In one example, display element 420 is color coded based on the degree of impact of the risk (e.g., high impact is highlighted in red, medium impact is highlighted in yellow, and low impact is highlighted in green).

Figure 9:
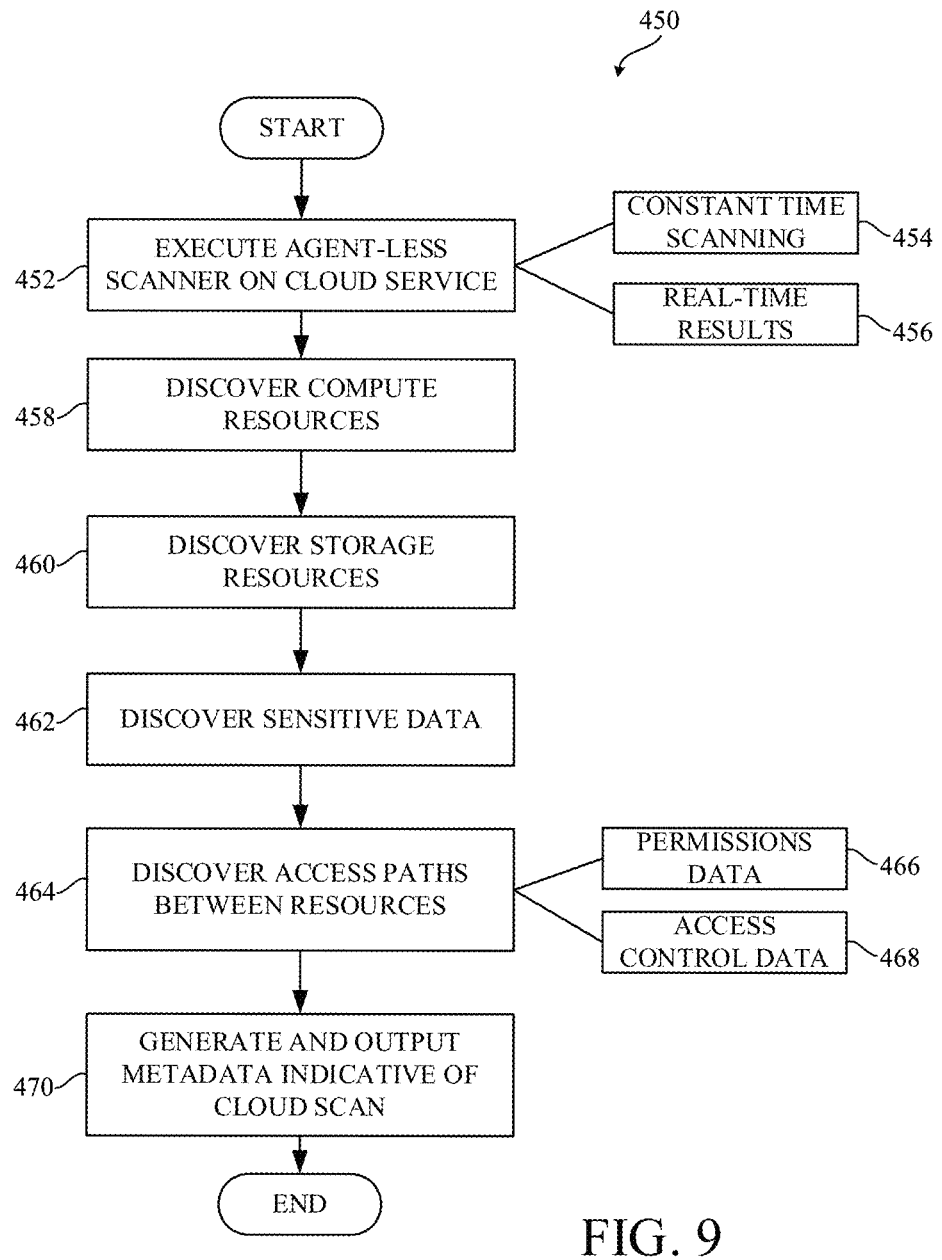
FIG. 9 is a flow diagram illustrating one example of cloud infrastructure scanning performed by a cloud scanner deployed in a cloud service.
Figures 1, 10:
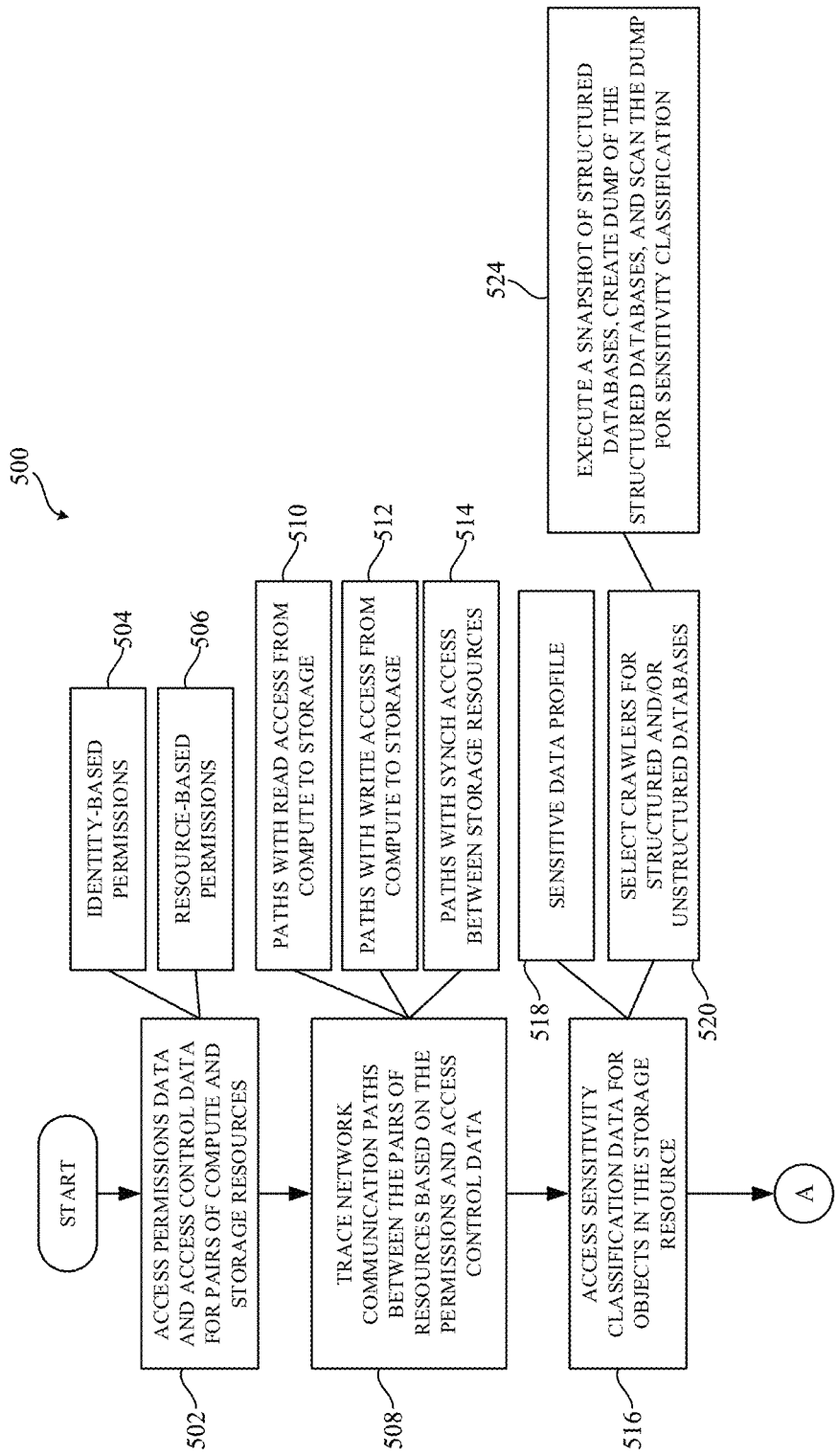
Figures 2, 10:
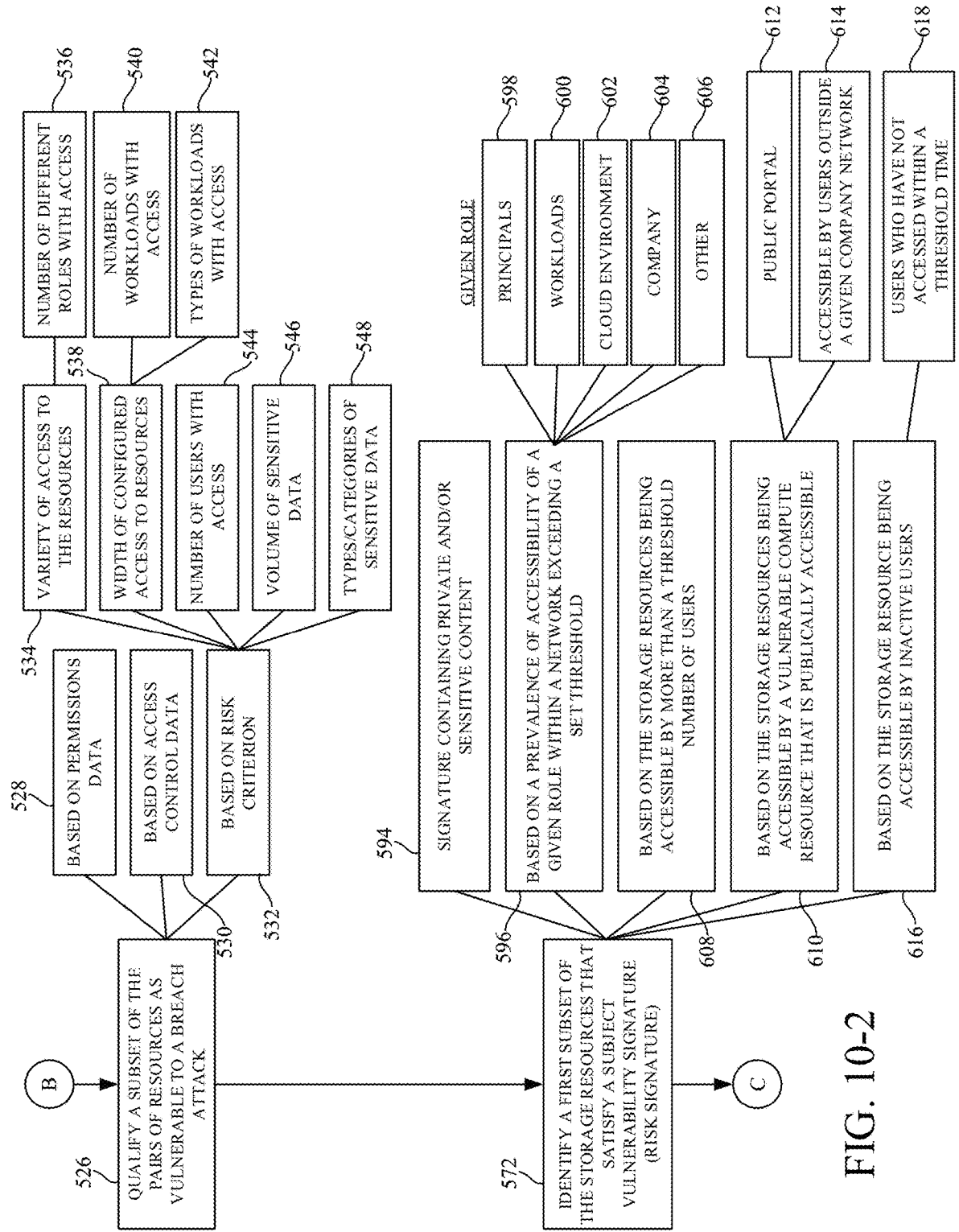
Figures 3, 10:
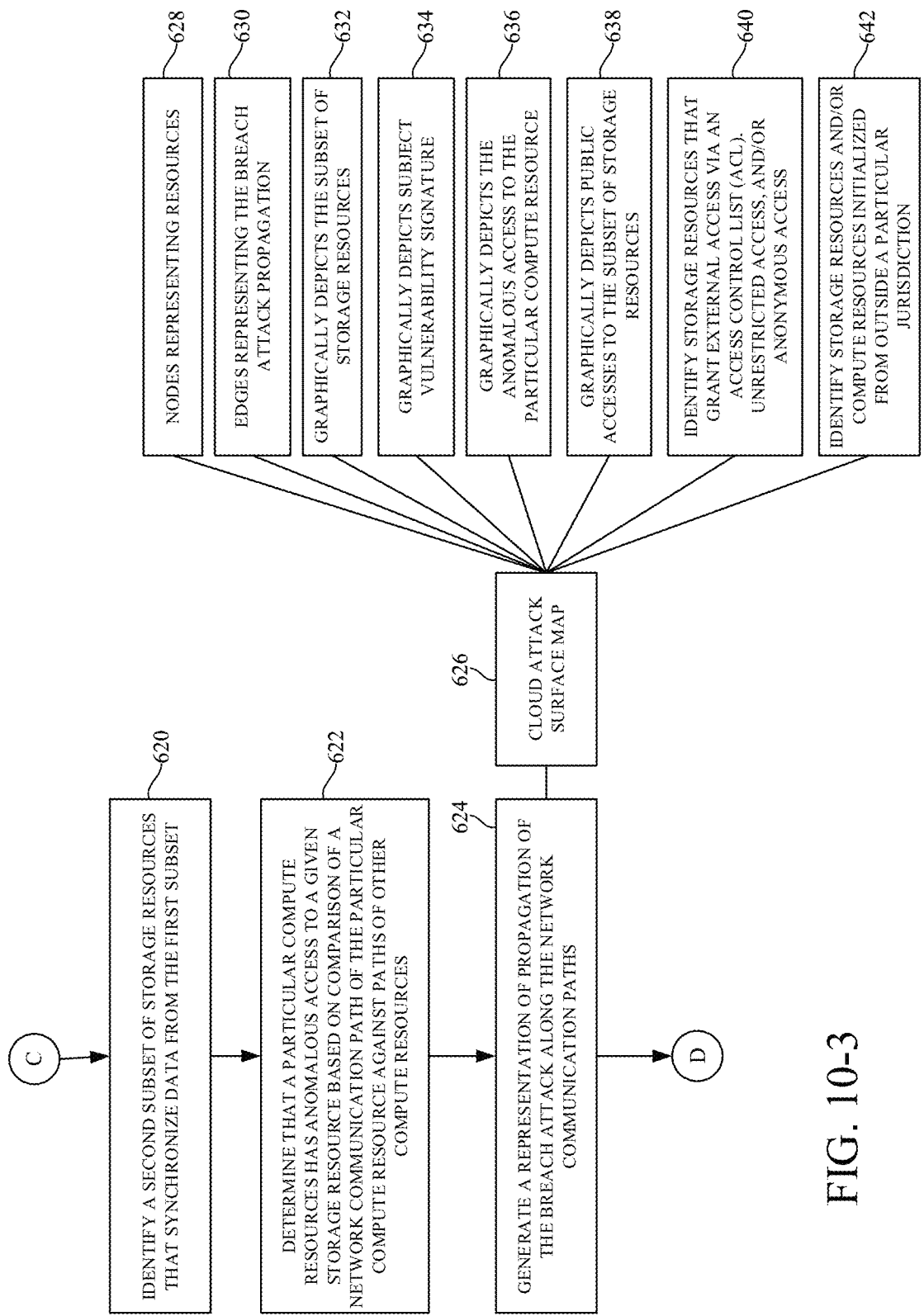
Figures 4, 10:
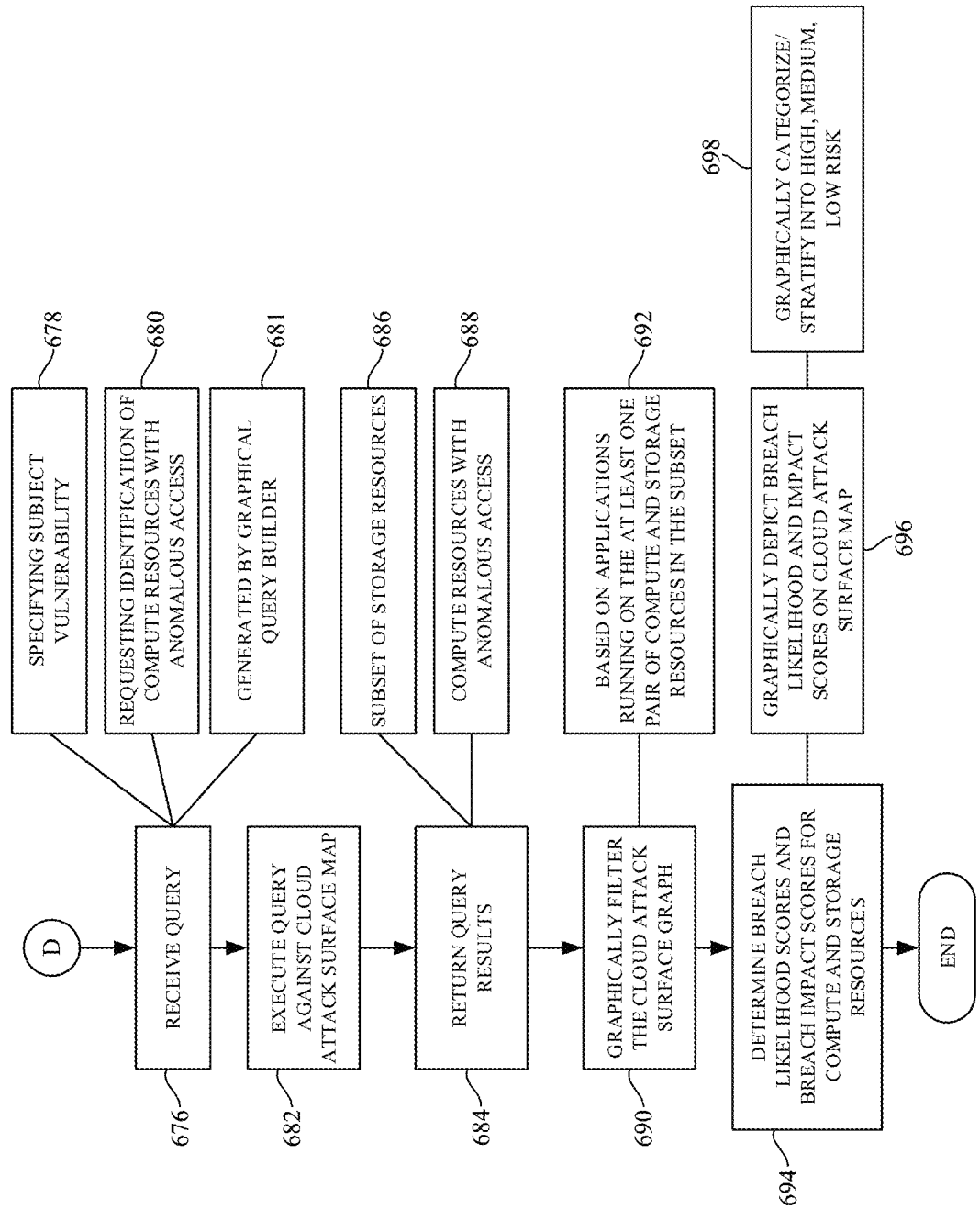

FIG. 9 is a flow diagram 450 illustrating one example of cloud infrastructure scanning performed by cloud scanner 148 deployed in cloud service 108-1. At block 452, an agent-less scanner is executed on the cloud service. The scanner can perform constant time scanning at block 454.

An example constant time scanner runs an algorithm in which the running time does not depend, or has little dependence on, the size of the input. The scanner obtains a stream of bytes and looks for a multiplicity of patterns (one hundred patterns, two hundred patterns, three hundred patterns, etc.) in one pass through the stream of bytes, with the same or substantially similar performance.

Further, the scanner can return real-time results at block 456. Accordingly, cloud security posture analysis 122 receives updates to the security posture data as changes are made to the cloud services.

At block 458, the scanner discovers the compute resources 130 and, at block 460, the storage resources 132. Sensitive data can be discovered at block 462. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 464, access paths between the resources are discovered based on permissions data 136 (block 466), and/or access control data 138 (block 468). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 470, metadata indicative of the scanning results is generated and outputted by metadata output component 272.

FIGS. 10-1, 10-2, 10-3, and 10-4 (collectively referred to as FIG. 10) provide a flow diagram 500 illustrating an example operation for streamlined analysis of security posture. For sake of illustration, but not by limitation, FIG. 10 will be discussed in the context of cloud security posture analysis system 122 illustrated in FIG. 3. Security posture can be analyzed by system 206 using metadata 252 to return from the cloud service scanners.

At block 502, permissions data and access control data are accessed for pairs of compute and storage resources. The permissions and access control data can include identity-based permissions at block 504, resource-based permissions at block 506, or other permissions as well.

At block 508, network communication paths between the pairs of resources are traced based on the permissions and access control data. For example, the permissions and access control data can identify which paths have read access from a compute resource from a particular compute resource to a particular storage resource, as represented at block 510. Similarly, paths with write access from compute to storage resources can be identified at block 512, paths with synchronization access between storage resources can be identified at block 514. Of course, other types of paths can be identified as well.

For sake of example, but not by limitation, a directional graph is constructed to captures all resources as nodes, with labels assigned to the nodes for search and retrieval. In the AWS example, labels can mark a node as a database or S3 resource. Similarly, labels can represent actors as normal users, admins, developers, etc. Then, known relationships are identified between the nodes, for example using the information available from the cloud infrastructure configuration (e.g., defining a resource belongs to a given account). Similarly, a relationship can be created between the policy attached to a resource, and/or the roles that can be taken up by a user. In addition to storing static information, a rule processing engine (e.g., using JavaScript Object Notation (JSON) metadata) to analyze the roles and policies and build the "access" relationship between the nodes. The analysis can be used to decode the policy to get the access type (e.g., allow, deny, etc.), and the placement of the policy in a node can be used to link from the source node to target node and create the access relationship (e.g., allow, deny, etc.). Similarly, role definitions can be analyzed to find the access type. The graph can therefore include various types of nodes, updated to reflect direct relationships.

An iterative process can be performed to find transitive relationships between resources (e.g., resource access for a given entity/actors/resources). In one example, for each access relationship from a first node N1 to a second node N2, the process identifies all incoming access relationships of N1. Then, the access types targeting node N1 are analyzed and updated. Using the relationships identified to access N1, the relationships to N2 are updated, and a new set of access relationships are identified to N2 through N1. The process continues to proceed to identify all such relationships with the goal of creating relationships to all nodes that have sensitive data.

In one example, block 508 identifies "access types" which include normalized forms of access permissions. For example, an access type "can read" can be defined to include a plurality of different read objects within AWS (e.g., defined in terms of allowable APIs). Similarly, the AWS permissions "PutObject" and "PutObjectAcl" are transformed to a normalized access type "can write" within system 122.

At block 516, sensitivity classification data is accessed for objects in the storage resources. The sensitivity classification data can include sensitive data profiles at block 518.

At block 520, crawlers can be selected for structured and/or unstructured databases. Crawling the databases can include executing a snapshot of structured databases, creating a dump of structured databases, and scanning the dump for sensitivity classification, as represented at block 524.

At block 526, a subset of the pairs of resources are qualified as vulnerable to a breach attack. The qualification can be based on the permissions data at block 528, the access control data at block 530, and/or risk criterion at block 532. The risk criterion can include any of a wide variety of different types of criteria. For example, a risk criterion can indicate a variety of access to the resources at block 534. One example includes a number of different roles with access to the resource, as represented at block 536.

Also, a risk criterion can indicate a width of configured access to the resources, at block 538. For example, the width of configured can include a number of workloads with access to the resources (block 540) and/or a type of workload with access to the resources (block 542).

A risk criterion can also indicate a number of users with access to the resources at block 544, a volume of sensitive data in the resources at block 546, and/or types of categories of sensitive data at block 548. Of course, other types of risk criterion can be utilized as well.

Figure 11:
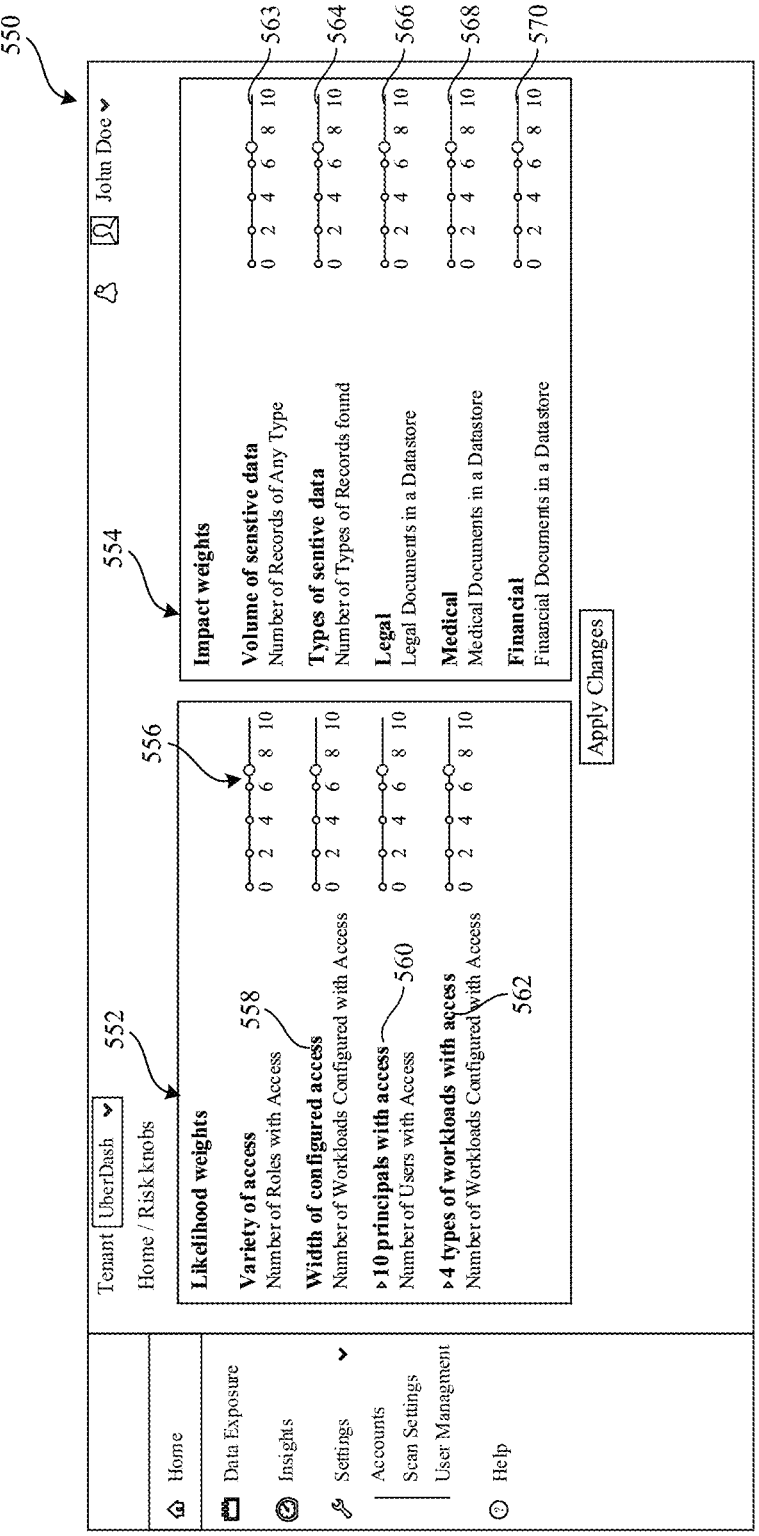
FIG. 11 illustrates one example of a user interface display that facilitates user definition of a risk criterion.

In one example, the risk criterion can be defined based on user input. FIG. 11 illustrates one example of a user interface display 550 that facilitates user definition of risk criterion. Display 550 includes a set of user input mechanisms that allows a user to define likelihood weights, represented at numeral 552, and impact weights, represented at 554.

For sake of illustration, a first user input mechanism 556 allows a user to set a weight that influences a likelihood score for variations in the variety of access to the resources (e.g., block 534). Similarly, controls 558, 560, and 562 allow a user to set weights that influence likelihood scores for a width of configured access, a number of principles or users with access, and the type of workloads with access, represented by reference numerals 558, 560, and 562, respectively.

Similarly, controls 563, 564, 566, 568, and 570, allow a user to set weights on impact scores for risk criterion associated with a volume of sensitive data, a type of sensitive data, and categories of sensitive data (i.e., legal data, medical data, financial data), respectively.

Referring again to FIG. 10, at block 572, a first subset of the storage resources that satisfy a subject vulnerability signature are identified. A subject vulnerability signature illustratively includes a risk signature indicative of a risk of vulnerability or breach.

FIG. 12 illustrates an example user interface display 574 that can be accessed from display 304 illustrated in FIG. 6, and displays a set of risk signatures. The risk signatures can be predefined and/or user-defined. For example, display 574 can include user input mechanisms that allow a user to add, delete, or modify a set of risk signatures 576. As noted above, each risk signature defines a set of criteria that the resources and data in cloud service 108-1 can be queries upon to identify indications of vulnerabilities in the cloud service. The risk signatures in FIG. 12 include a name field 578, a unique risk signature ID field 580, and a description identified in a description field 582. A result header field 584 identifies types of data that will be provided in the results when the risk signature is matched. A resource field 586 identifies the type of resource, and a tags field 588 identifies tags that label or otherwise identify the risk signature. Additionally, a likelihood factor field 590 indicates a likelihood factor that is assigned to the risk signature and an impact factor signature 592 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

Referring again to FIG. 10, the first subset of storage resources identified at block 572, are based on determining that the storage resources satisfy a risk signature of containing private and/or sensitive content, as represented at block 594. In another example, the subject vulnerability signature is based on a prevalence of accessibility of a given role within a network exceeding a set threshold, as represented at block 596. For instance, the given role can include principles (block 598), workloads (block 600), a cloud environment (block 602), a company (block 604), or other roles (block 606).

Also, the subject vulnerability signature can indicate that the storage resources are accessible by more than a threshold number of users, as represented at block 608. Also, the subject vulnerability signature can indicate that the storage resources are accessible by a vulnerable compute resource that is publicly accessible, as represented at block 610. This determination can be based on identifying that the compute resource is accessible through a public portal, at block 612 and/or is accessible by users outside a given company network at block 614.

As represented at block 616, the subject vulnerability signature can indicate that the storage resources are accessible by inactive users. For example, inactive users can include users who have not accessed the resources within a threshold time, at block 618.

At block 620, a second subset of storage resources are identified that synchronization data from the first subset. At block 622, a particular compute resource is determined to have anomalous access to a given storage resource. The identification of anomalous access can be based on a comparison of a network communication path of the particular compute resource against paths of other compute resources. For example, the paths of other compute resources can be used to identify an expected communication path for the particular compute resource and/or expected permission for the particular resource. Then, if a difference above a threshold is identified, the particular compute resource is identified as anomalous.

At block 624, a representation of the propagation of the breach attack along the network communication paths is generated. In one example, the representation includes a cloud attack surface map, as represented at block 626. An example cloud attack surface map includes nodes representing the resources (block 628) and edges representing the breach attack propagation (block 630). The map graphically depicts the subset of storage resources (block 632) and the subject vulnerability signature (block 634). Also, the map can graphically depict the anomalous access to the particular compute resource (block 636). For example, public accesses to the subset of storage resources can be graphically depicted at block 638 and storage resources that grant external access and/or resources that are initialized from outside a particular jurisdiction can be identified at blocks 640 and 642, respectively.

Figure 13:
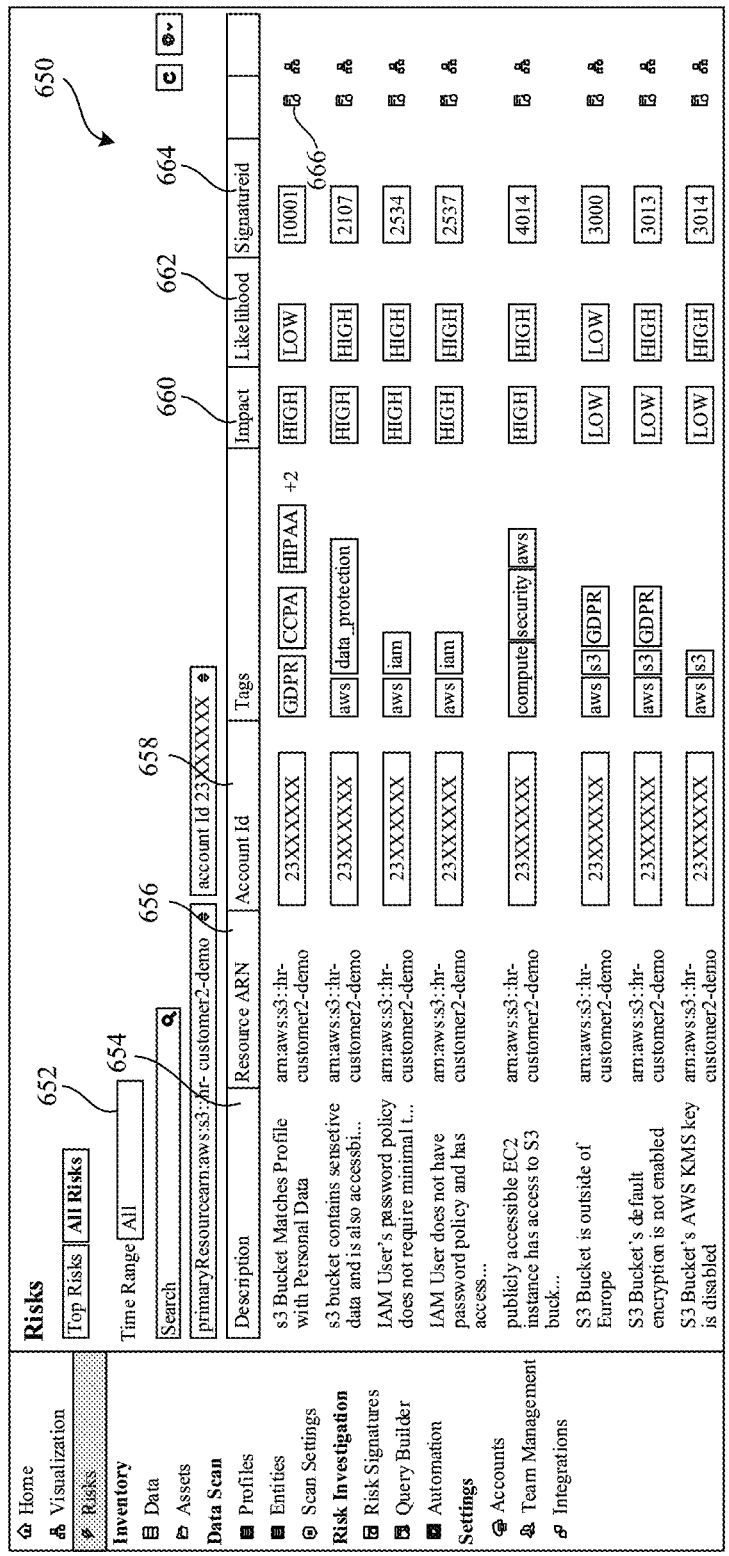
FIG. 13 illustrates one example of a user interface display that graphically depicts vulnerability risks.

FIG. 13 illustrates one example of a user interface display 650 that graphically depicts vulnerability risks, in tabular form. In one example, display 650 renders the data discussed with respect to the cloud attack surface at block 626 of FIG. 10 in a table.

Figure 14:
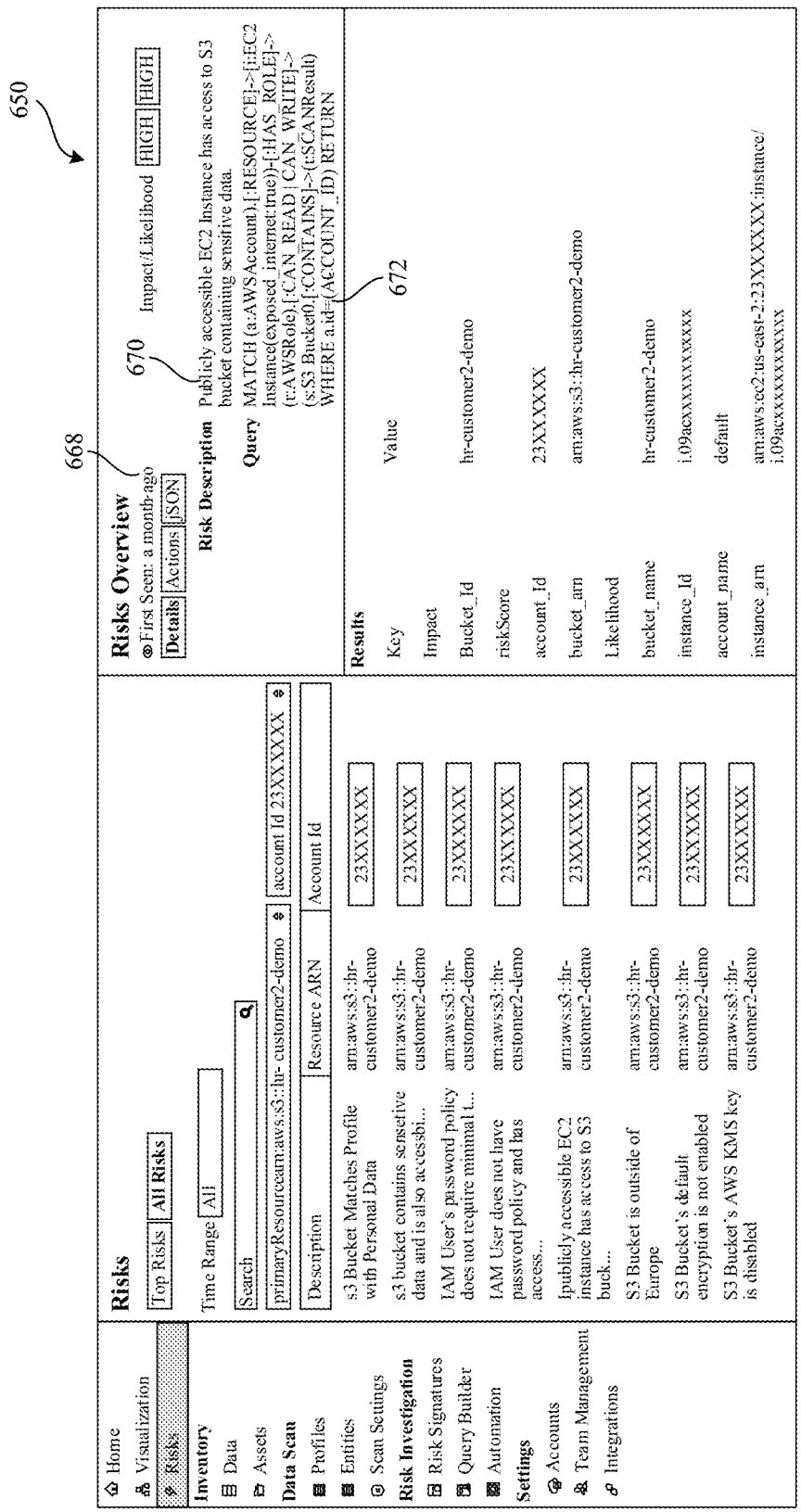
FIG. 14 illustrates one example of a details display pane.

Display 650 includes a user input mechanism 652 to specify a time range for visualizing the risk, and includes a description 654, a resource identifier 656, and an account identifier 658 for the cloud service account. The display can also indicate the impact 660 and likelihood 662 of the vulnerability risk, as well as signature identifier 664 that identifies the particular risk signature that was matched. Display 650 also includes a details control 666 that is actuatable to display details of the identified risk. One example of a details display pane 668 is illustrated in FIG. 14. Display pane 668 shows a description of the risk at display element 670 and an indication 672 of the query utilized to match the risk signature.

Referring again to FIG. 10, at block 676 a query is received for execution against the results of the metadata analysis. For example, a query represents a subject path signature, such as by specifying a subject vulnerability at block 678. As represented at block 680, the query can request identification of resources with anomalous access. At block 681, the query is generated by graphical query builder component 250 illustrated above in FIG. 3. The query can be obtained from data store 210 (e.g., queries 256), or the query can be obtained directly from graphical query builder component 250 as the query is generated based on user input. Operation of graphical query builder component 250 is discussed in further detail below.

At block 682, the query is executed against the cloud attack surface map. For example, the cloud attack surface map can be filtered to identify results that match the query. The query results (e.g., the filtered map) is returned at block 684. The filtered results can include identifying a subset of storage resources that match the query (block 686) and/or resources having anomalous access at block 688.

The cloud attack surface graph is graphically filtered based on the results at block 690. For example, the graph can be filtered based on applications running on the pairs of resources in the identified subset (block 692). Breach likelihood scores and breach impact scores are determined for the resources at block 694, and the scores can be depicted on the cloud attack surface map at block 696. In one example, the scores are graphically categorized or stratified at block 698 into high, medium, or low risk. One example is discussed above with respect to FIG. 8.

Figure 15:
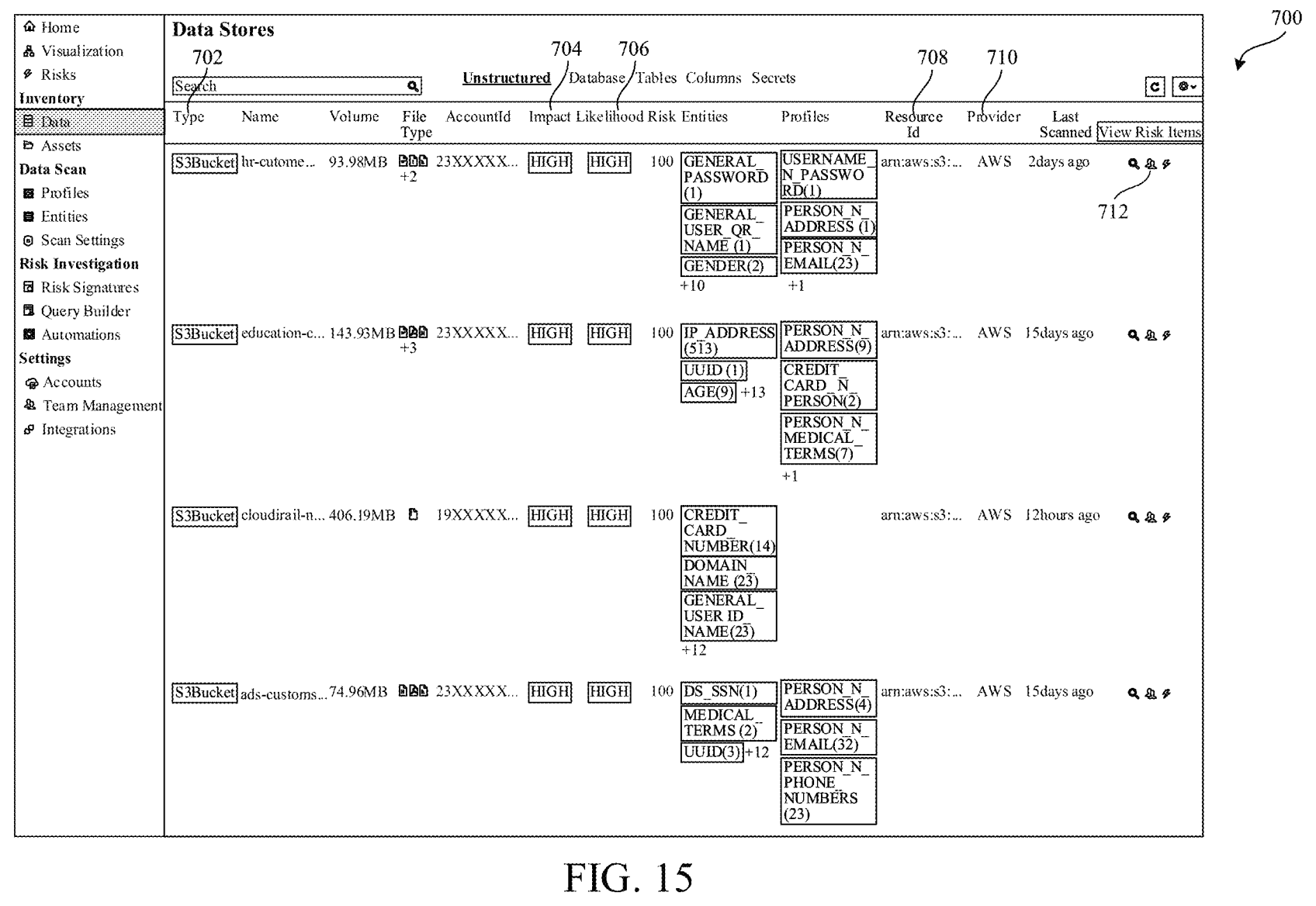
Figure 16:
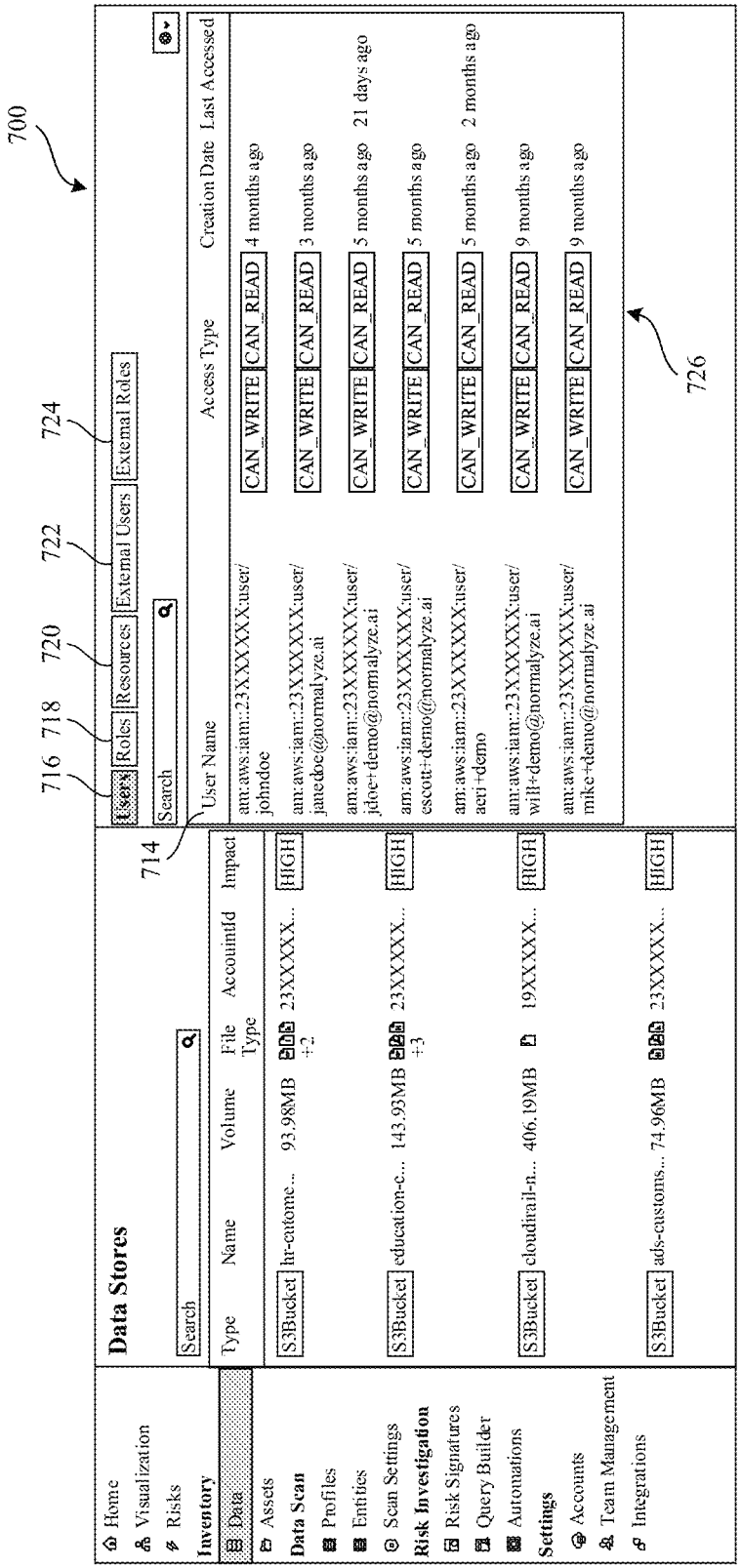
FIG. 16 illustrates one example of a user interface display having a details pane that displays details for a given resource.

FIG. 15 illustrates one example of a user interface display 700 configured to graphically depict breach likelihood and impact scores. Display 700 identifies data stores in storage resources 132 that are identified as meeting a subject vulnerability. Each entry shown in display 700 identifies a type 702 of the resource, an impact score 704, a likelihood score 706, a resource identifier 708 that identifies the resource, and a cloud service identifier 710 that identifies the particular cloud resource. Based on actuation of a risk item view generator mechanism 712, display 700 shows details for the given resource in a display pane 714, as shown in FIG. 16. Display pane 714 can show users 716 that have access to the resource, roles 718 that have access to the resource, other resources 720 that have access to the resource, as well as external users 722 or external roles 724. Display pane 714 also shows the access type 726.

Figure 17:
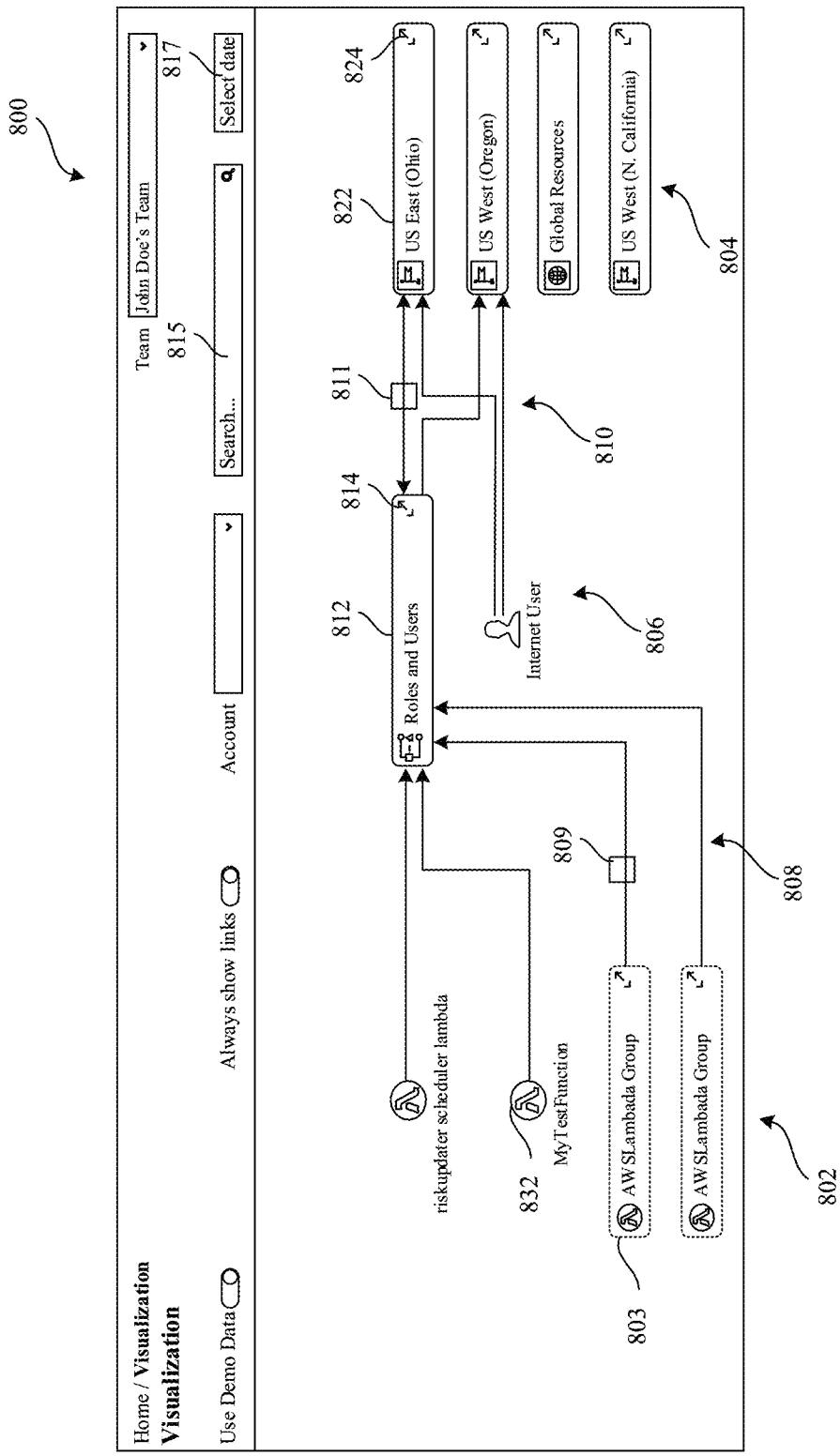
FIG. 17 illustrates a user interface display that includes a visualization of access communication paths.

FIG. 17 illustrates a user interface display 800 that includes a visualization of access communication paths. The visualization in FIG. 17 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths. For example, the visualization in FIG. 17 can be configured to render the subset(s) of resources identified in FIG. 10. That is, display 800 can include the cloud attack surface map at block 626.

As shown in FIG. 17, nodes 802 represent compute resources and nodes 804 represent storage resources. Illustratively, the storage resources include data stores or buckets within a particular cloud service. Nodes 806 represent roles and/or users. The links (e.g., access paths) or edges 808 between nodes 802 and 806 represent that compute resources that can access the particular roles represented by nodes 806. The edges or links 810 represent the storage resources that can be accessed by the particular roles or users represented by nodes 806.

Based on these relationships between compute and storage relationships, display elements can be rendered along, or otherwise visually associated with, the edges 808 and/or 810, to identify and graphically depict the propagation of breach attack. For instance, vulnerability display elements can be rendered in association with edges 808 and/or 810 to identify that a subject vulnerability signature (e.g., one or more risk signatures shown in FIG. 12) has been identified in the data, based on querying the permissions and access control data using the subject vulnerability signature. For example, display element 809 represents a risk signature between nodes 803 and 812 and display element 811 represents (such as by including a description, icon, label, etc.) a risk signature between nodes 812 and 822. Each display element 809, 811 can represent (such as by including a description, icon, label, etc.) corresponding likelihood and impact scores, can be actuatable to render details of the subject vulnerability, such as in a display pane on display 800. The details can include which risk signature has been matched, which sensitive data is at risk, etc.

The graph can be interactive at a plurality of different resolutions or levels. For example, a user can interact with the graph to zoom into a specific subset, e.g., based on cloud vendor concepts of proximity (regions, virtual private clouds (VPCs), subnets, etc.). Node 812 includes an expand actuator 814 that is actuatable to expand the display to show additional details of the roles, role groups, and/or users represented by node 812.

When zooming into one region, such as when using the actuators discussed below, other regions can be zoomed out. This can be particularly advantageous when handling large diagrams. Further, the graph includes one or more filter mechanisms configured to filter the graph data by logical properties, such as names, values of various fields, IP addresses, etc. For example, a free form search box 815 is configured to receive search terms and filter out all resources (e.g., by removing display of those resources) except those resources matching the search terms. In one example, the search terms include a subject vulnerability signature (e.g., containing private and sensitive content, public accessibility, accessibility by a particular user and/or role, particular applications running on the resources, access types, etc.).

An input mechanism 817 is configured to receive a temporal filter or search criterion. For example, a filter criterion is entered by a user to represent at least one of a creation time or date of computer resources and storage resources. Further, a query can be entered specifying at least one temporal period, wherein the cloud infrastructure map is updated to graphically return at least one prior state (e.g., a permissions state, an access control state, and/or a sensitivity data classification state) of compute resources and storage resources based on the temporal period.

A checkbox (not shown in FIG. 17, and which can be global to the diagram) provides the ability to toggle whether or not direct neighbors of the matching resources are also displayed, even if those neighbors themselves don't match the search terms. This allows users to search for specific resources and immediately visualize all entities that have access to the searched resources. To illustrate, assume a search for personally identifiable information (PII) matches a set of S3 buckets. In this case, the graph renders resources that have access to that PII. Further, the graph can show associated data and metadata (e.g., properties extracted from cloud APIs, properties derived such as presence of sensitive data, access paths, etc.). This data and metadata can be shown on a panel to the left or right of the diagram. Further, user can actuate user interface controls to collapse/expand this panel. In one example, the panel remains collapsed or expanded until changed, even across different searches and login sessions. Additionally, the display can group properties in related categories (e.g., summary, all metadata retrieved from the cloud, all metadata derived, local annotations, etc.), and the diagram can be filtered (such as by using the free form search bar mentioned above) by metadata such as tags, applications running on them, identified owners, time since created, etc.). The state of the resources can be shown as of a user defined date or time. A calendar component can allow users to select a particular date to visualize historical state data as of that particular date.

Referring again to FIG. 17, the nodes 804 representing the storage resources are also actuatable to show additional details. For example, node 822 includes an actuator 824 that is actuatable to display a view of the constituents of the storage resource represented by node 822. One or more of the elements are further actuatable to show additional details of the constituent.

Figure 18:
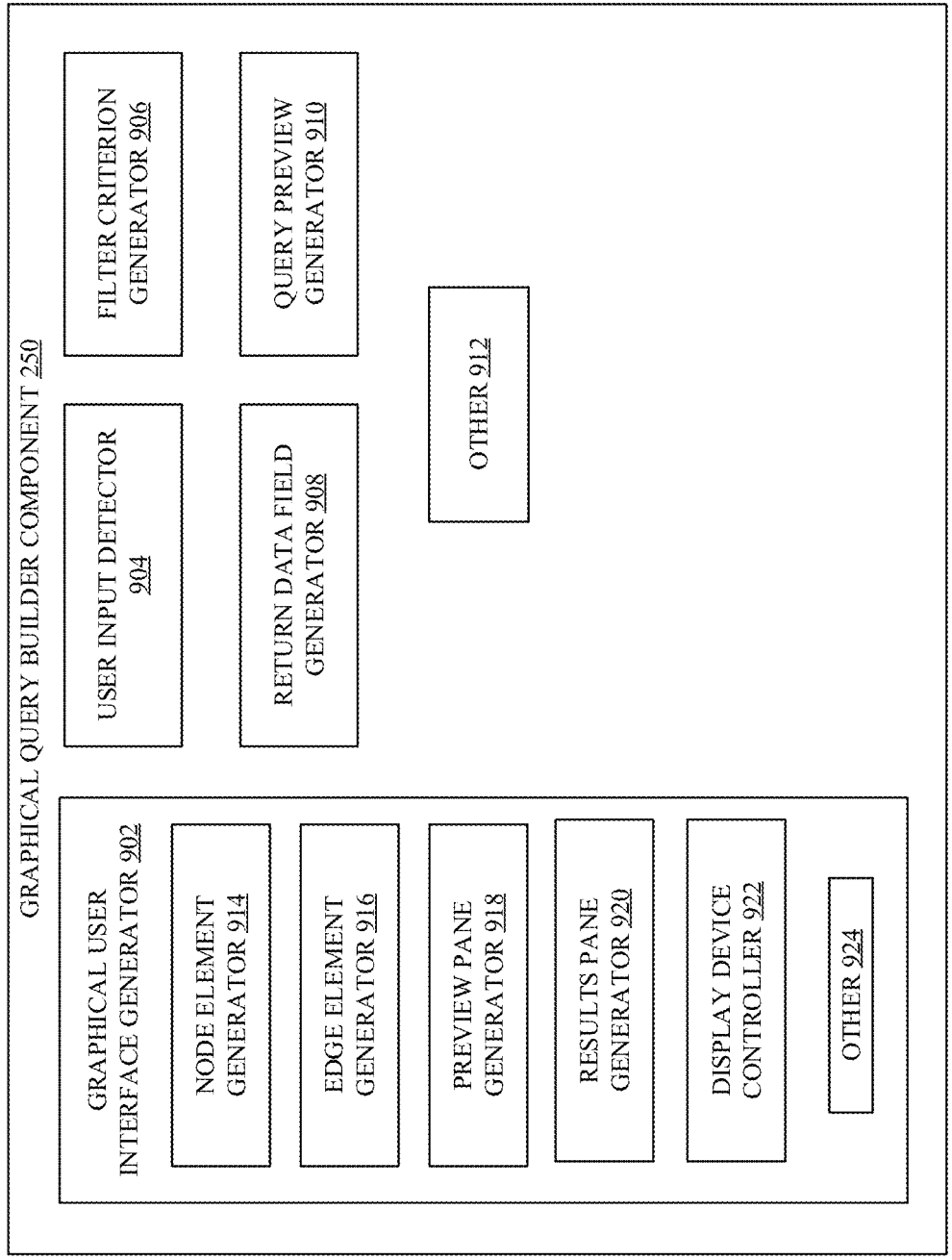
FIG. 18 illustrates one example of a graphical query builder component.

FIG. 18 illustrates one example of graphical query builder component 250. Graphical query builder component 250 includes a graphical user interface generator 902, a user input detector 904, a filter criterion generator 906, a return data field generator 908, and a query preview generator 910. Component 250 can include other items 912 as well.

Graphical user interface generator 902 includes a node element generator 914 configured to generate node elements in a graphical user interface. The node elements represent entities in a subject path signature defined by the query being generated by component 250. Generator 902 also includes an edge element generator 916 configured to generate edge elements between the node elements. The edge elements represent relationships between the entities represented by respective node elements. The node display elements and edge display elements represent entities, and relationships between the entities, in a subject path signature. The subject path signature is used to define a query against a set of network communication paths identified in the cloud environment. Examples of identifying network communication paths is discussed above with respect to FIG. 10.

Graphical user interface generator 902 also includes a preview pane generator 918, a results pane generator 920, a display device controller 922, and can include other items 924 as well. Preview pane generator 918 generates a display pane that renders a preview representation of the query defined by the node elements and display elements. Results pane generator 920 is configured to generate a results pane on the graphical user interface that displays the query results in response to execution of the query. Display device controller 922 is configured to generate control signals to control a display device to render the graphical user interface. Examples of graphical user interfaces are described in further detail below.

Filter criterion generator 906 is configured to generate filter criterion relative to the entities and relationships represented by the node and edge display elements. A filter criterion is utilized to filter the results for the entities and relationships returned through the query.

Return data field generator 908 is configured to generate one or more return data fields. Each return data field defines the type of data to be returned in response to the query. For example, a return data field can define a property, or set of properties, of an entity represented by a given node display element. In executing the query, the return data field is passed in as a variable and extracts a value for the property, which is returned in the query results. In one example of a relational database, a return data field can include a SQL field. As such, the query can return a value for a database column.

Query preview generator 910 is configured to generate a query preview that provide a preview representation, such as a serialized representation of the query. The preview pane generated by preview pane generator 918 is configured to render the preview representation of the query, and can include input mechanisms for generating the filter criterion and/or the return data fields.

Figures 1, 19:
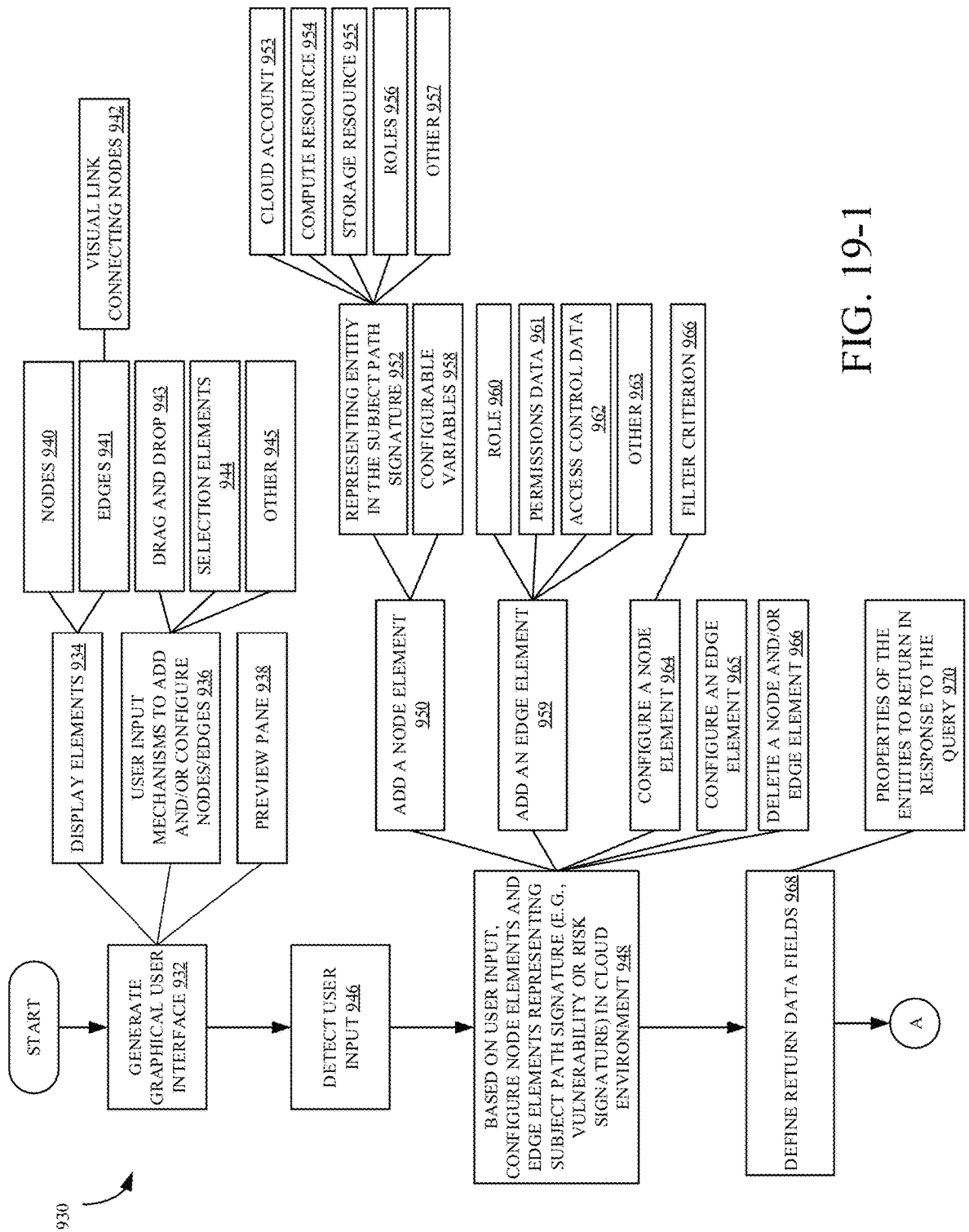
Figures 2, 19:
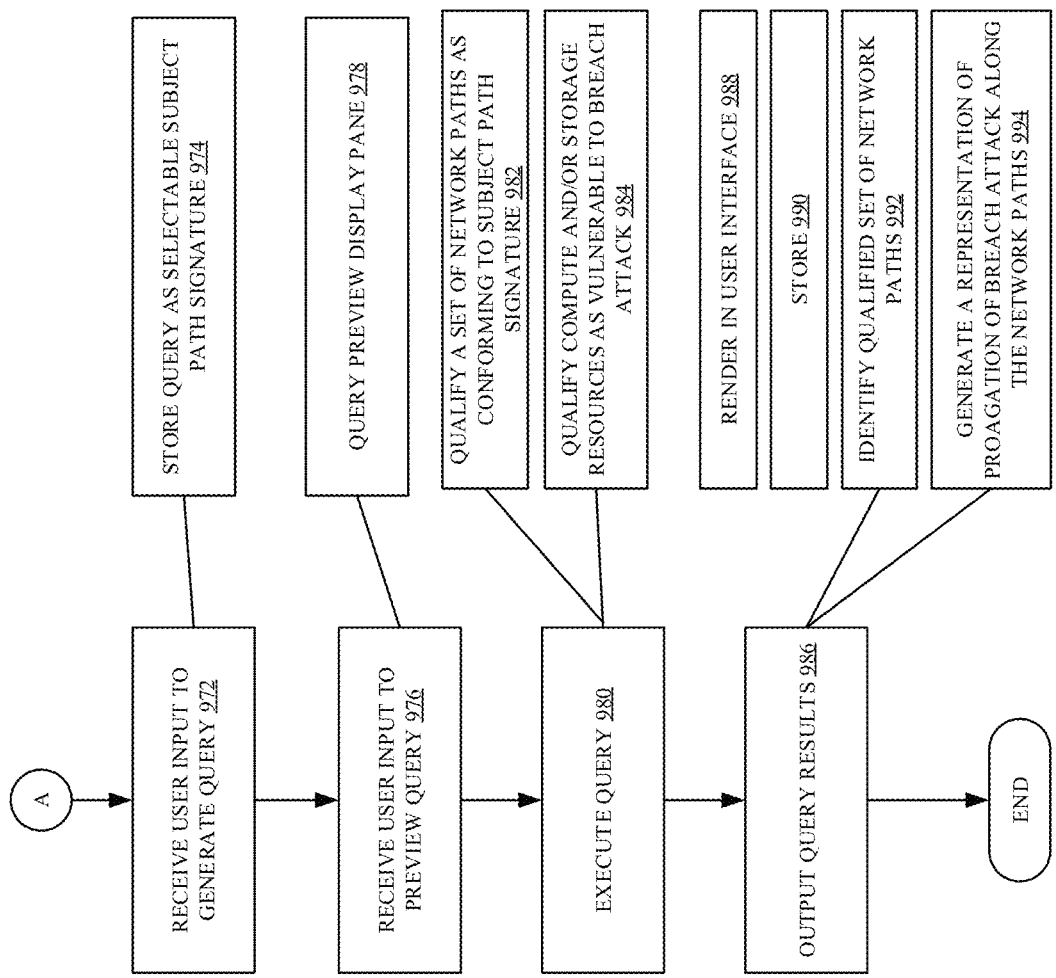

FIGS. 19-1 and 19-2 (collectively referred to as FIG. 19) illustrate a flow diagram 930 of one example of generating a graphical query builder user interface that receives user inputs to generate and execute a query. For sake of illustration, but not by limitation, FIG. 19 will be described in the context of graphical query builder component 250 and example graphical user interface displays illustrated in FIGS. 20-28.

At block 932, a graphical user interface is generated for creating a new query and/or modifying an existing query (e.g., a query 256 stored in data store 210). The graphical user interface includes display elements (block 934), user input mechanisms (block 936), and a preview pane (block 938). Display elements include node display elements (block 940), edge display elements (block 941), and can include other display elements as well. As represented at block 942, each edge display element includes a visual link that connect two or more node display element and defines a relationship between the entities represented by the two or more node display elements. In the case wherein an existing query is being modified, the query definition can be retrieved from storage and the display elements on the graphical user interface recreated based on the query definition.

An entity represented by a node display element corresponds to a location in the network path in the cloud environment. Accordingly, the entity can include any of a variety of constituents in the cloud environment. For example, when network communication paths are identified, such as by tracing paths between pairs of resources based on permissions and access control data (e.g., block 508 in FIG. 10), the entities can include locations within the network communication paths.

Figure 20:
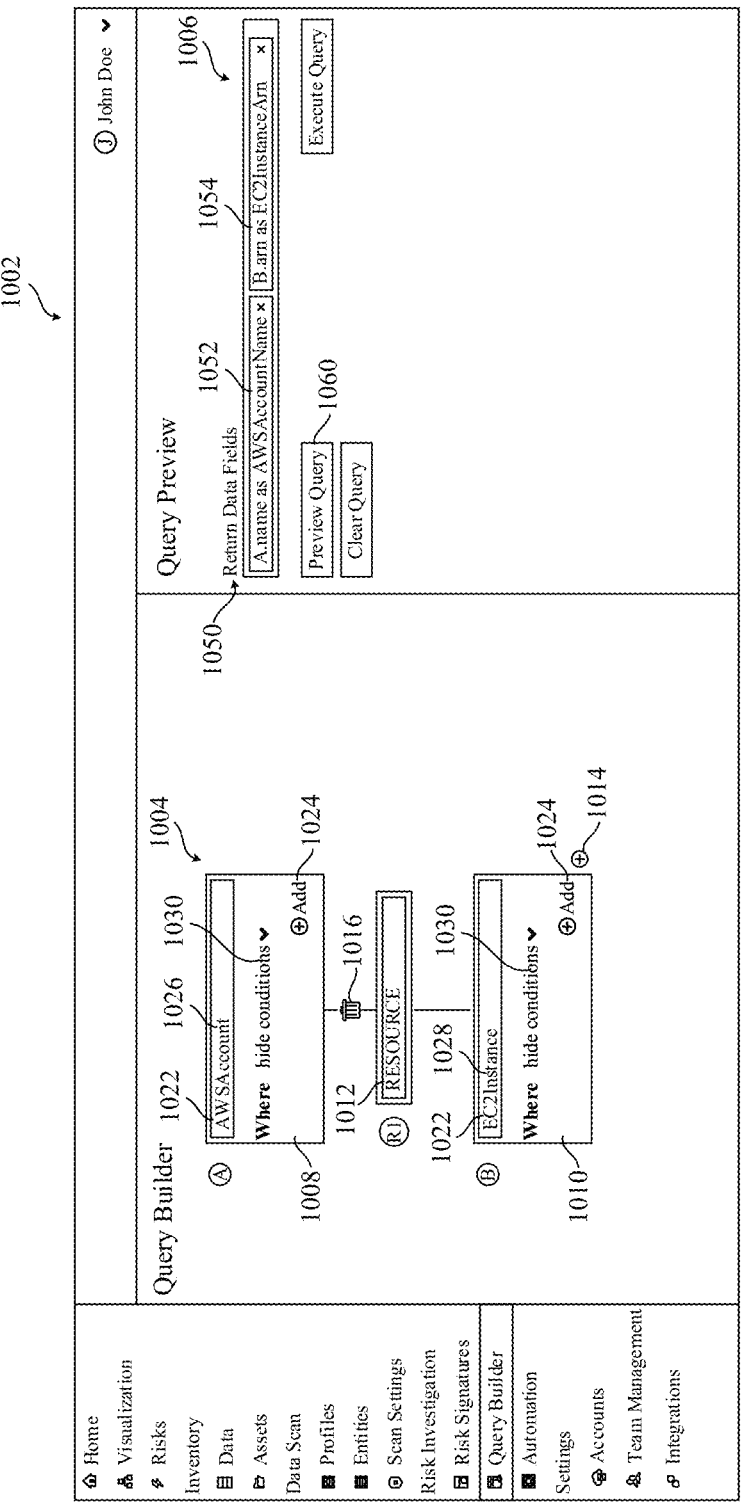

As shown in FIG. 20, display 1002 includes display elements 1004 and a preview pane 1006. Display elements 1004 include a set of node display elements and one or more edge display elements that link two or more of the node display elements. Illustratively, the node display elements in FIG. 20 include a first node display element 1008 and a second node display element 1010. An edge display element 1012 includes a visual link between node display elements 1008 and 1010.

Referring again to FIG. 19, the user input mechanisms can include mechanisms configured to add, delete, and/or modify the node and edge display elements. For example, user input mechanisms can include drag and drop mechanisms 943, selection elements 944, and can include other mechanisms 945 as well. Mechanisms 943 can allow the user to drag new display elements onto the user interface or to move existing display elements on the user interface, for example to change relative positional relationships between those elements.

User input is detected at block 946, and, at block 948, the node display elements and/or edge display elements are configured to represent a subject path signature in the cloud environment. For example, the subject path signature can include a vulnerability or risk signature. At block 950, a node display element is added to the graphical user interface to represent an entity in the subject path signature (block 952). As noted above, an entity can include any of a variety of constituents in the cloud environment. For example, an entity can include a cloud account 953, a compute resource (block 954), a storage resource (block 955), a role (block 956), and can represent other items (block 957) as well.

A node display element can also include configurable variables, as represented at block 958. The configurable variables can represent parameters or filter criterion to be used for the query. At block 959, an edge display element is added to the graphical user interface display. The edge display element can be added automatically, in response to a new node display element being added at block 950. Alternatively, or in addition, an edge display element can be added in response to a user input that places a new link between existing node display elements. The edge display element can represent a role (block 960), permissions data (block 961), access control data (block 962), or other items (block 963) as well.

The user input can configure a node element (block 964) and/or configure an edge display element (block 965). In one example, a node display element can be configured by adding or defining a filter criterion at block 966. A node display element and/or edge display element can be deleted at block 966, in response to the user input.

Figure 21:
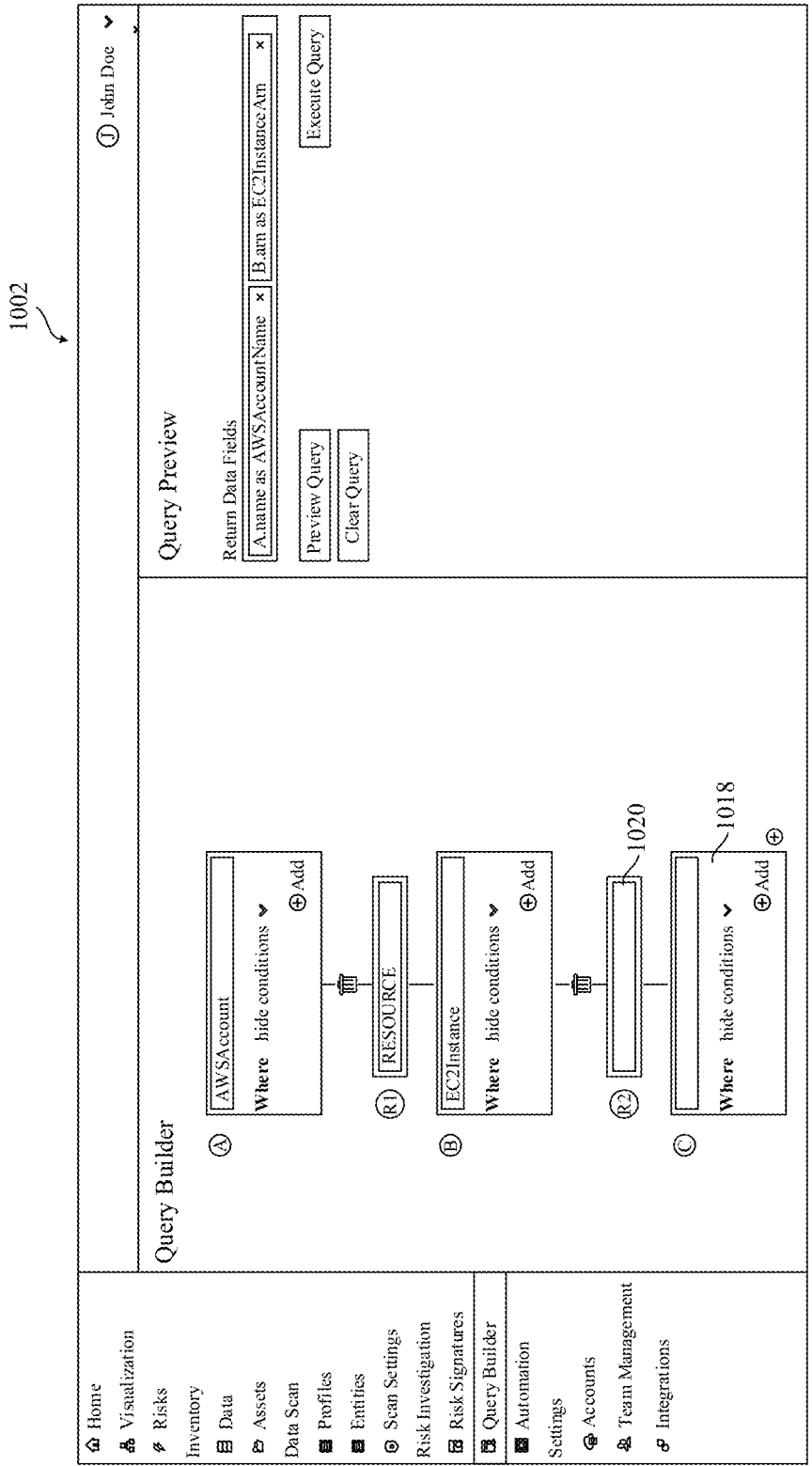

Referring again to FIG. 20, display 1002 includes a node addition user input mechanism 1014 and a node deletion user input mechanism 1016. User input mechanism 1014 is actuatable to add a new node display element 1018 and corresponding edge display element 1020, as shown in FIG. 21. User input mechanism 1016 is actuatable to delete node display element 1010 and the associated edge display element 1012.

Each node display element 1008, 1010 includes a corresponding entity selection user input mechanism 1022 and a filter criterion user input mechanism 1024. Entity selection user input mechanism 1022 is configured to receive user input to select the entity that is represented by the node display element. Mechanism 1022 can include, for example, a drop down list, text input box, or any other suitable user input mechanism. In the example shown in FIG. 20, node display element 1008 represents a particular cloud account, defined in field 1026. Similarly, node display element 1010 represents a particular compute instance, as represented by display element 1028. Further, each of the node display elements can include a condition definition user input mechanism 1030 configured to receive user input to define a condition upon which the entities are returned in the query.

Figure 22:
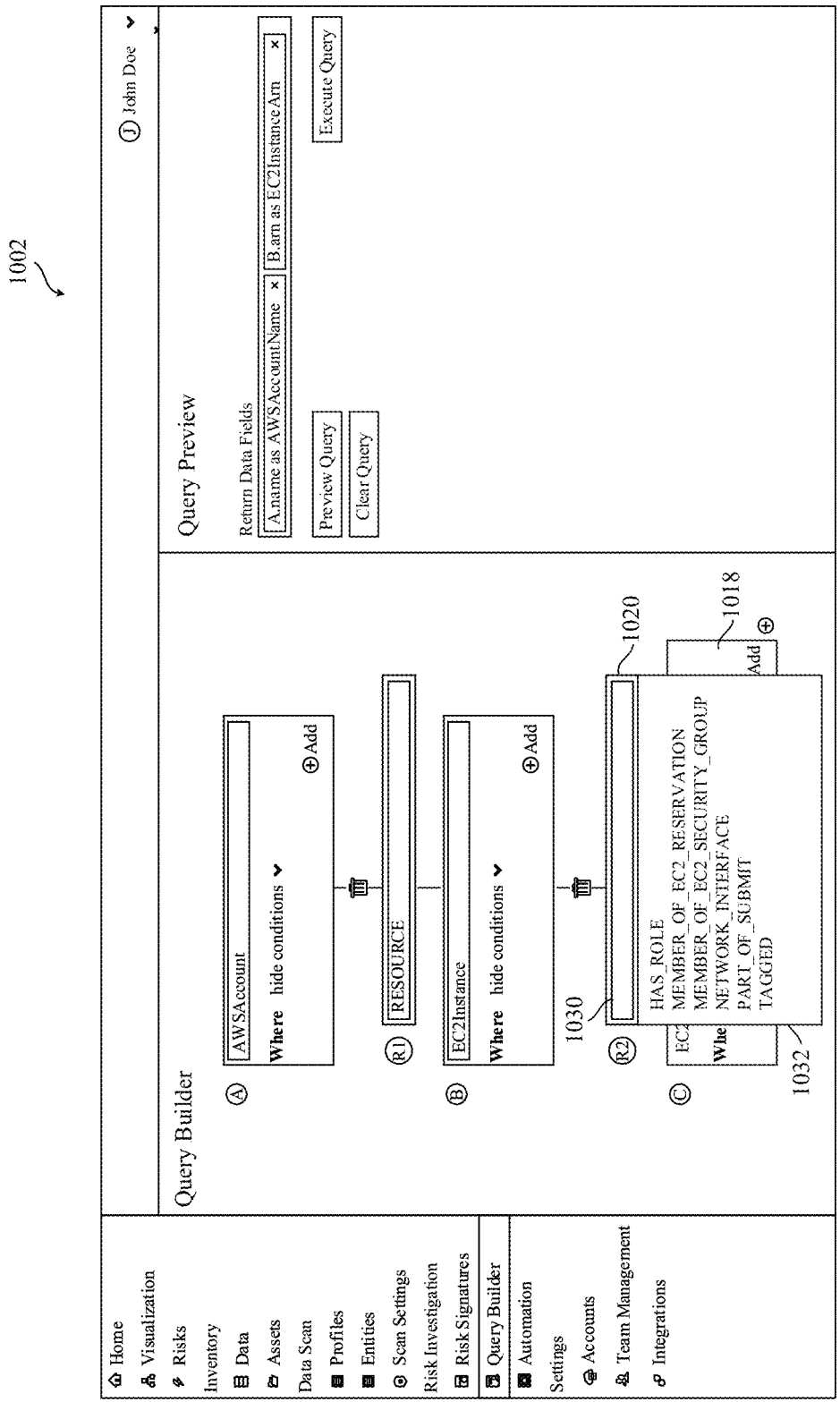

As shown in FIG. 22, node display element 1018 includes a user input mechanism 1030 configured to receive user input to define the particular relationship represented by edge display element 1020. Input mechanism 1030 can include a drop down menu 1032 configured to select the particular relationship represented by edge display element 1020.

Figure 23:
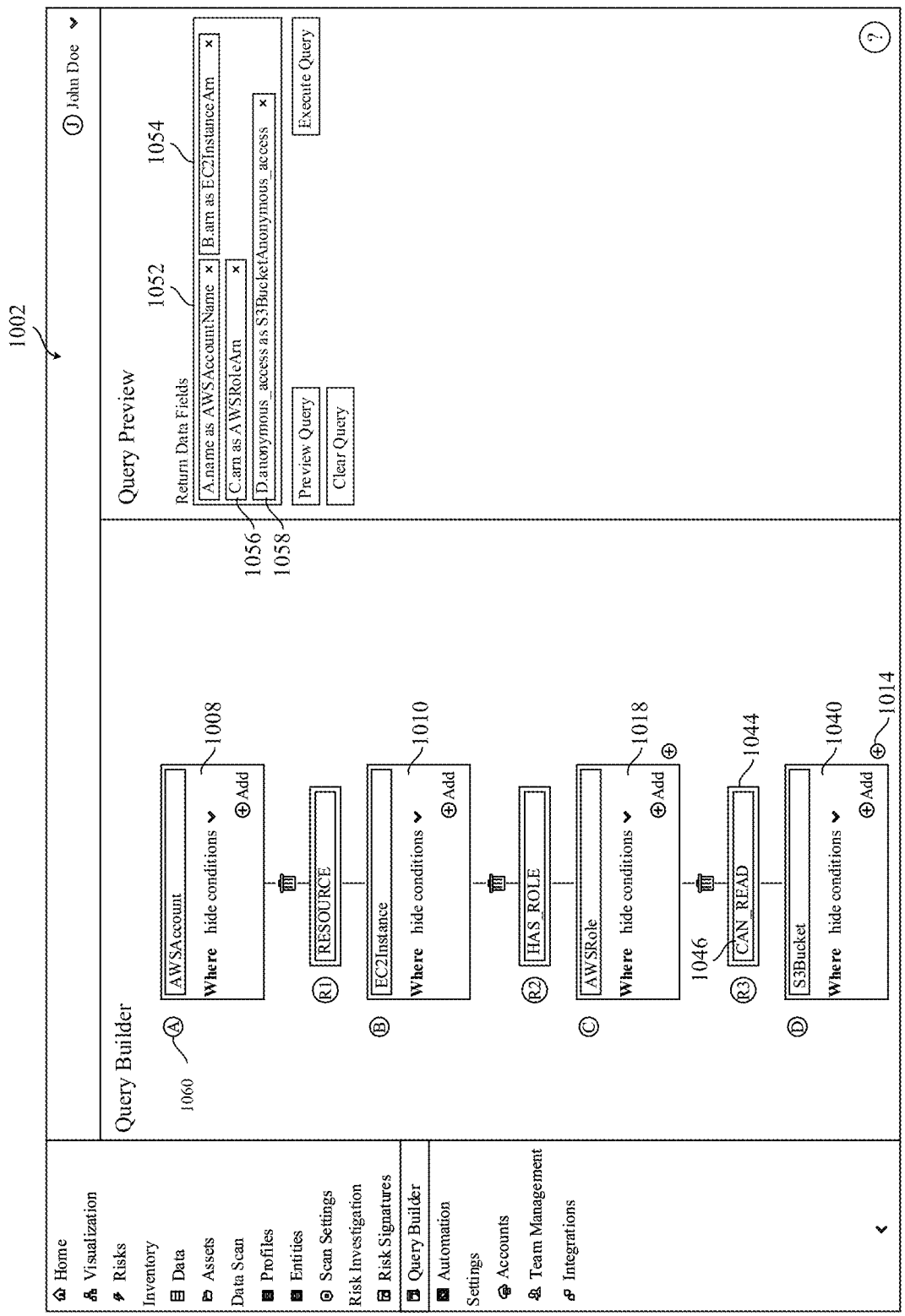
Figure 24:
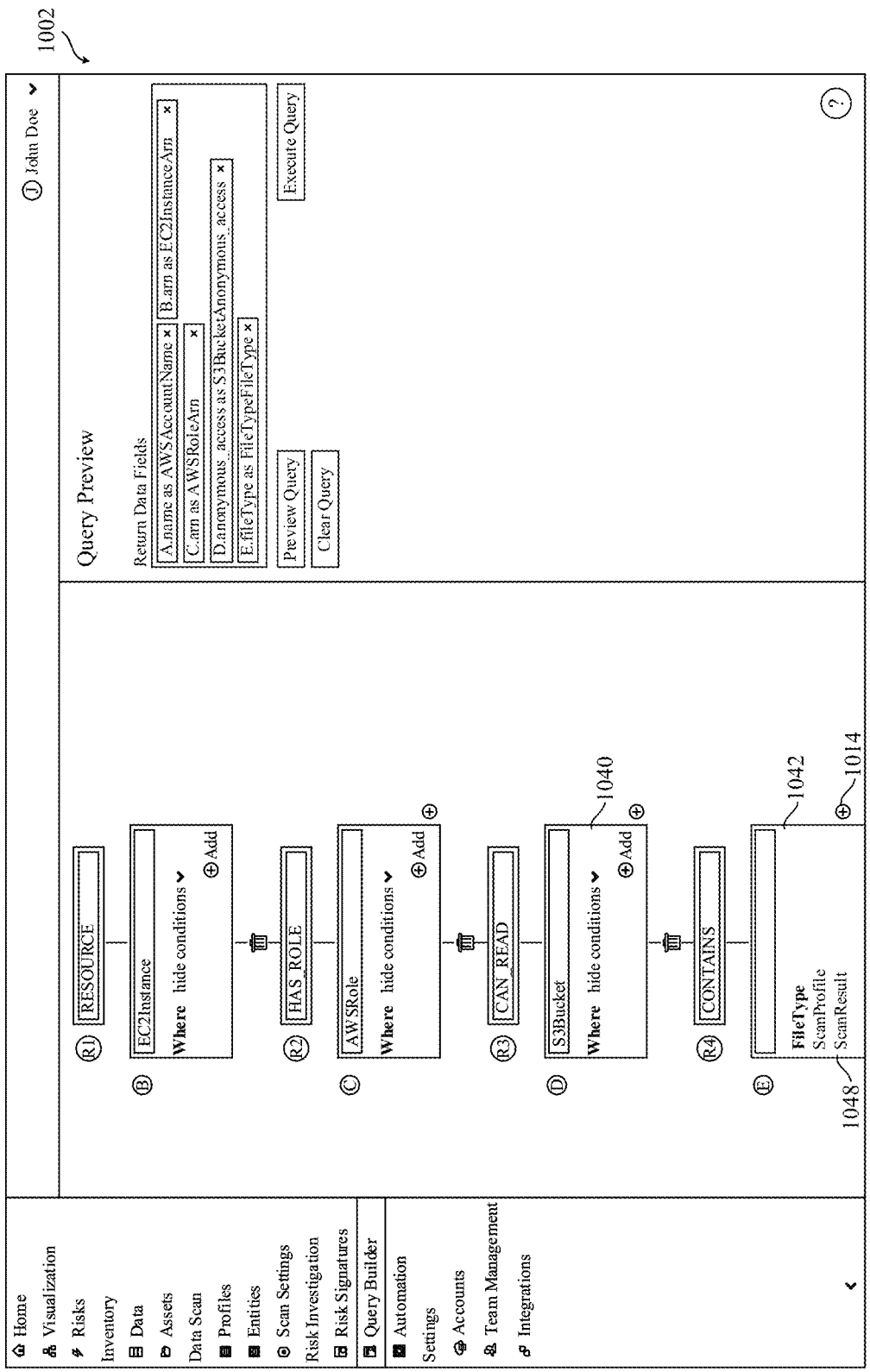

As shown in FIGS. 23 and 24, additional node display elements 1040 and 1042 are added by further actuation of node addition user input mechanism 1014. Further, an edge display element 1044 is added between node display element 1018 and node display element 1040. Element 1044 defines that the entity (e.g., a particular cloud role) represented by element 1018 has a relationship with the entity (e.g., a particular compute instance) represented by element 1040 such that the entity can read the compute resource. This relationship is visually identified by display field 1046 on display element 1044. FIG. 24 shows that display element 1042 includes a drop down menu 1048 that allows a user to select the entity represented by 1042.

Referring again to FIG. 19, at block 968 a set of return data fields are defined for the query. Illustratively, a return data field defines which data is returned when the query is executed against the network paths in the cloud environment. For example, a return data field can define one or more properties of an entity to return in response to the query, as represented at block 970. As shown in FIG. 20, preview pane 1006 includes a return data field display element 1050 that identifies properties of the entities as the return data fields. In the illustrated example, two return data fields 1052 and 1054 are shown, but of course the return data fields can include more than, or less than, two fields.

The return data fields can be defined in any of a number of ways. In one example, a user can define the data fields by directly providing user input into return data field display element 1050. Alternatively, or in addition, the return data fields can be defined using filter criterion user input mechanism 1024 to define the properties of the corresponding entities to be generated as the return data fields.

FIG. 23 shows that additional return data fields 1056 and 1058 have been added. Each return data field includes a visual identifier, such as label or tag, that identifies which node display element the return data field is associated with, along with a description of the property (or other data to be returned). For instance, return data field 1052 includes a label "A", where node display element 1008 also includes a corresponding label 1060. Return data field 1052 includes a description that indicates that return data field 1052 is associated with node display element 1008 and is configured to return the "name" property as the account name of the cloud account represented by node display element 1008. Similarly, return data field 1054 includes a label "B" indicating that return data field 1054 is associated with node display element 1010 and is configured to return the resource name which uniquely identifies the compute resource in the cloud environment. Similarly, return data field 1056 is configured to return the resource name that uniquely identifies the cloud environment role for the role represented by node display element 1018. Return data field 1058 includes a label "D" that visually identifies that field 1058 is associated with node display element 1040 and is configured to return a property indicating whether the storage resource represented by node display element 1040 is configured to allow anonymous access to data in the storage resource.

Referring again to FIG. 19, at block 972 a user input is received to generate the query based on the node and edge display elements in the user interface. In one example, the query is periodically generated/updated in response to detected changes to the display elements 1004. In another example, a query generation user input mechanism is provided on preview pane 1006, or otherwise, that is actuatable by the user to generate the query represented by display elements 1004 and the return data field display element 1050. The generated query can be stored as a selectable subject path signature, as represented at block 974. For example, the queries can be stored in data store 210.

At block 976, a user input is received to generate a preview of the query. For example, the query preview is rendered in preview pane 1006, as represented at block 978. In the example shown in FIG. 25, the query preview includes a serialized representation of the query, and includes the entities represented by the node display elements, the relationships between those entities, and any defined filter criterion and/or constraints, along with the defined return data fields.

Figure 25:
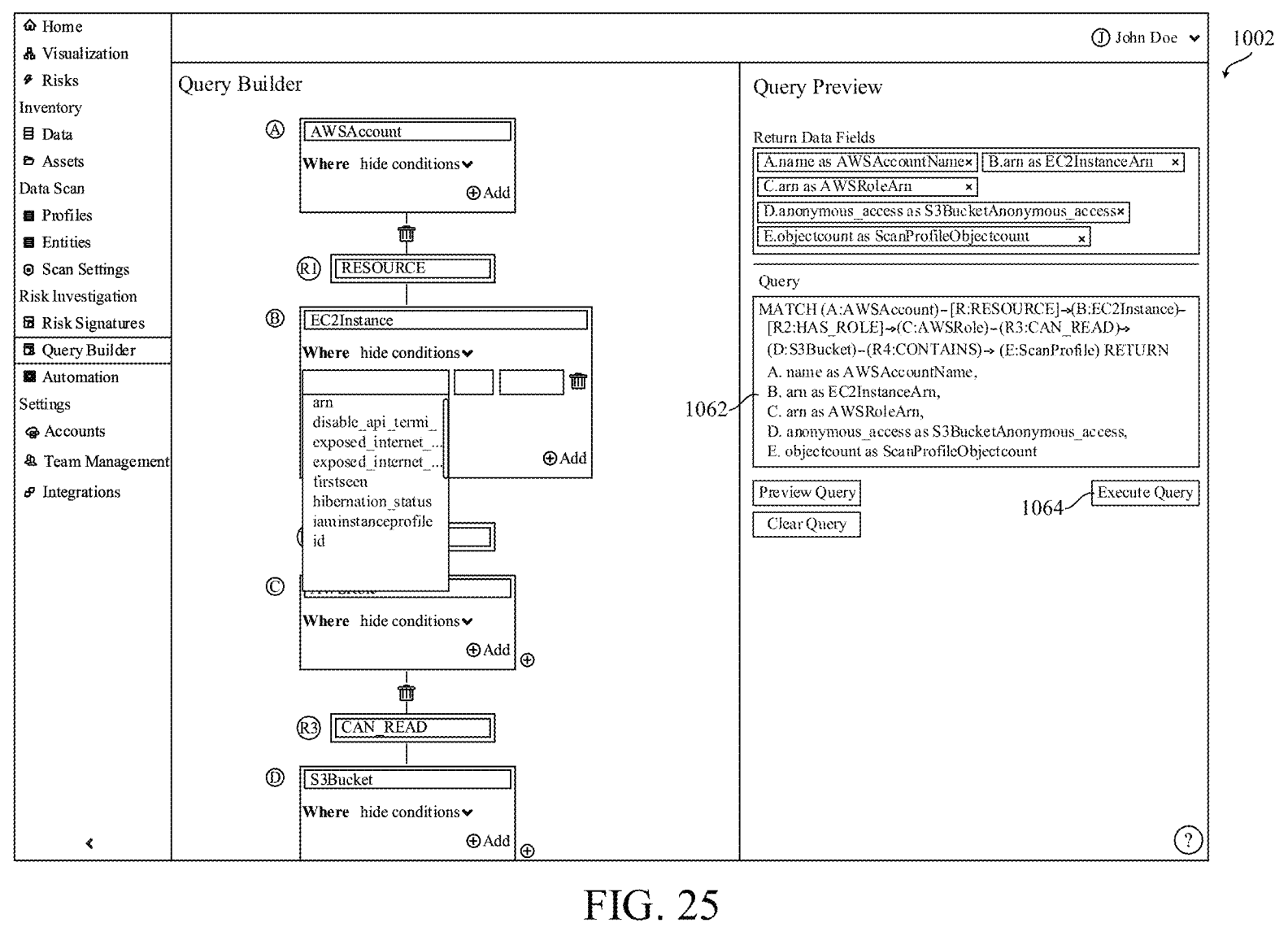

At block 980, the query is executed to generate query results. In one example, execution of the query qualifies a set of network paths as conforming to the subject path signature, as represented by block 982. For instance, compute and/or storage resources are qualified as being vulnerable to breach attack based on the subject path signature, as represented at block 984. In the example of FIG. 25, a query execution user input mechanism 1064 is actuatable to execute the query at block 980.

At block 986, the query results are output. Outputting the query results can include rendering the query results in the graphical user interface at block 988. Alternatively, or in addition, the query results can be stored in a data store, such as data store 210. In one example, the query results qualify set of network paths as matching the nodes and edges of the subject path signature, at block 992. Also, a representation of propagation of breach attack along network paths can be generated at block 994. Examples are discussed above.

Figure 26:
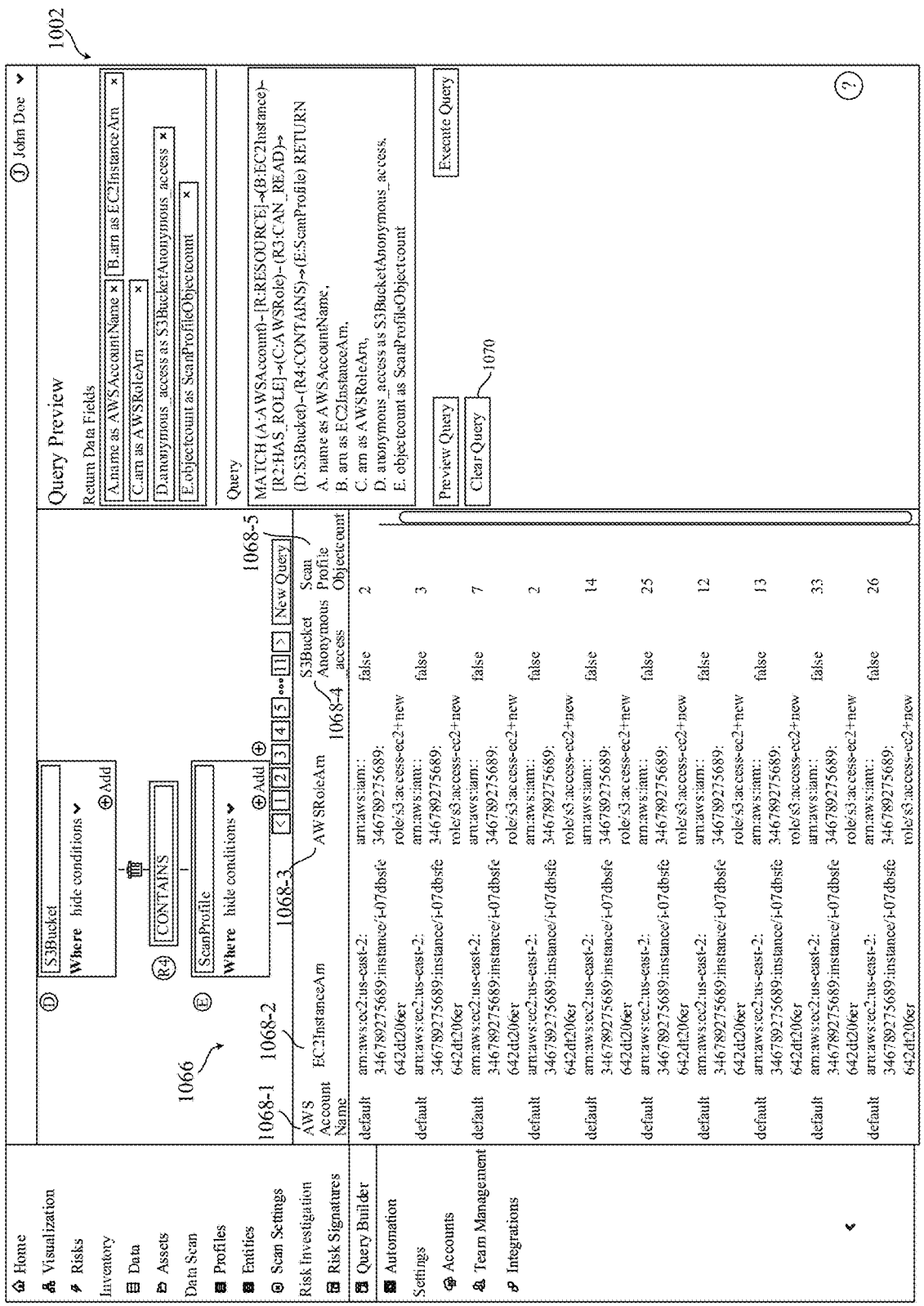

Referring to FIG. 26, user interface display 1002 includes a query results display area 1066 which renders the query results. The query results display area 1066 includes data fields 1068-1, 1068-2, 1068-3, 1068-4, and 1068-5 (collectively referred to as data fields 1068) that include the properties defined by the return data fields 1050. For example, data field 1068-1 identifies an account name, data field 1068-2 identifies a resource name of the respective compute resource, data field 1068-3 identifies a resource name of the respective role, data field 1068-4 identifies a value of an anonymous access state (whether the storage resource allows anonymous access), and data field 1068-5 identifies an object count of a scan profile. The query can be cleared through actuation of a user input mechanism 1070.

FIG. 27 illustrates another example of the query results display area 1066 having a set of return data fields 1072 that are based on the return data fields defined in the query 1074.

Figure 28:
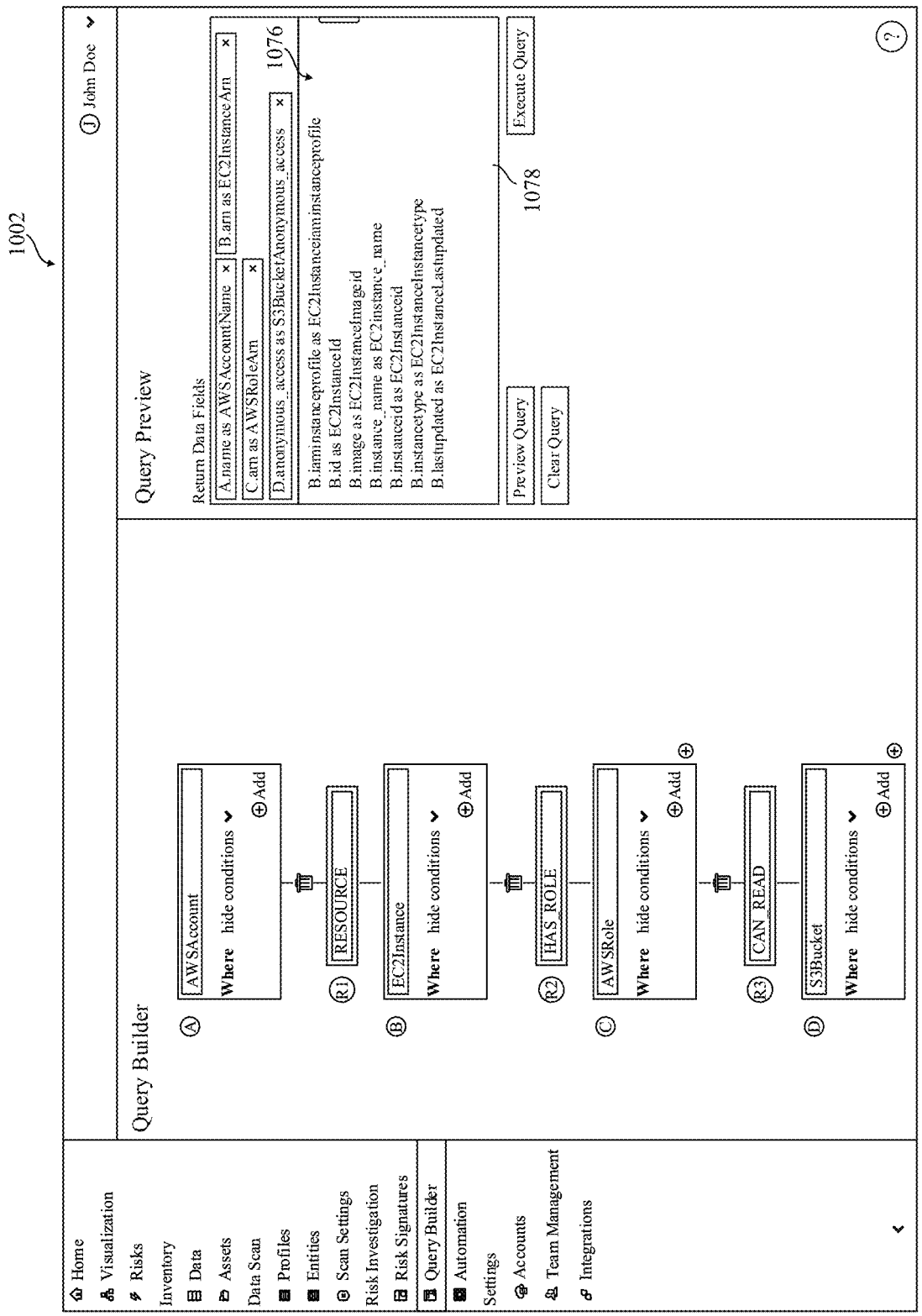

FIG. 28 illustrates one example of user input mechanisms 1076 for defining the return data fields. As shown, a scrollable list 1078 is provided and allows the user to select one or more properties from a list of available properties identified in the cloud environment for a given entity.

It can thus be seen that the present disclosure describes technology for security posture analysis of a cloud account. In some described examples, the technology can discover sensitive data among the cloud storage resources and as well as access patterns to the sensitive data, using local scanners that reduce or eliminate need to send the cloud data outside the cloud environment. This improves data security. Further, the technology facilitates the discover of security vulnerabilities to understand the data security posture, detect, and remediate the security vulnerabilities, and to prevent future breaches to sensitive data. The system provides real-time visibility and control on the control data infrastructure by discovering resources, sensitive data, and access paths, and tracking resource configuration, deep context, and trust relationships in real-time as a graph or other visualization.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic, and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 29:
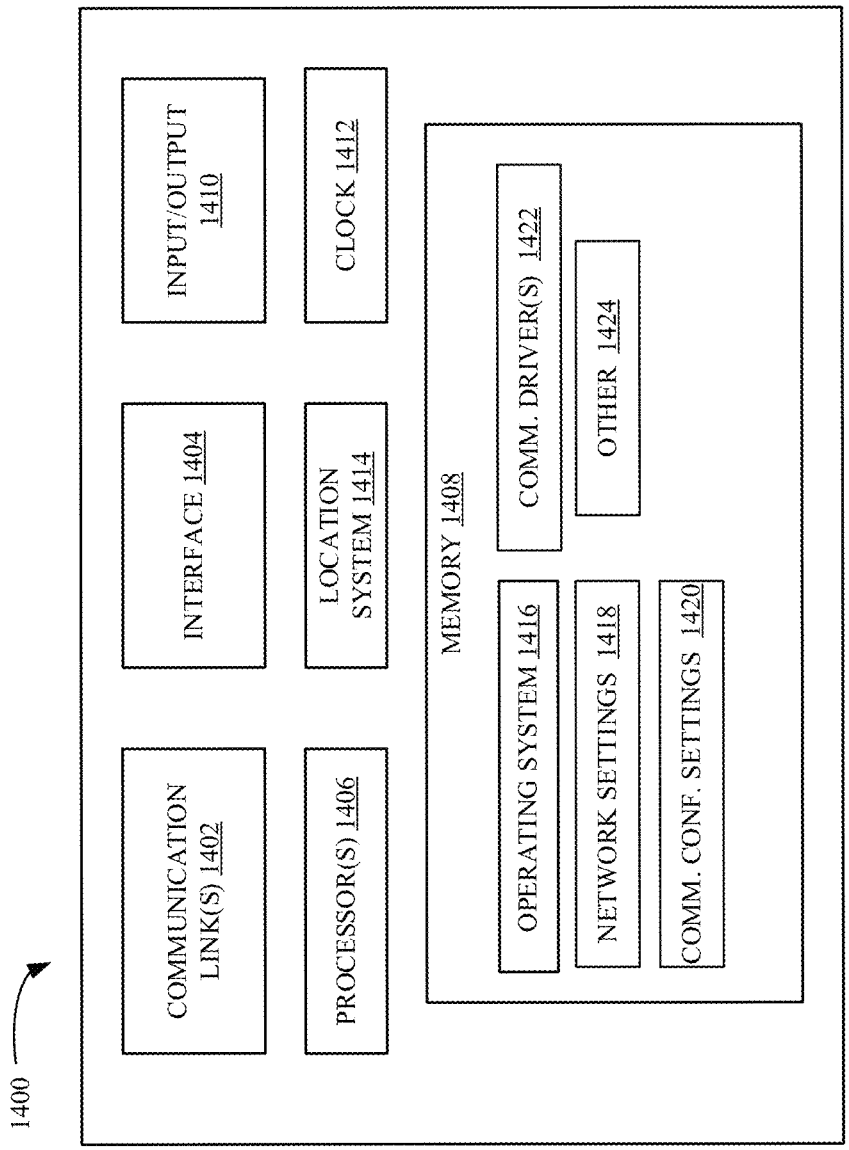
FIG. 29 is a simplified block diagram of one example of a client device.
Figure 30:
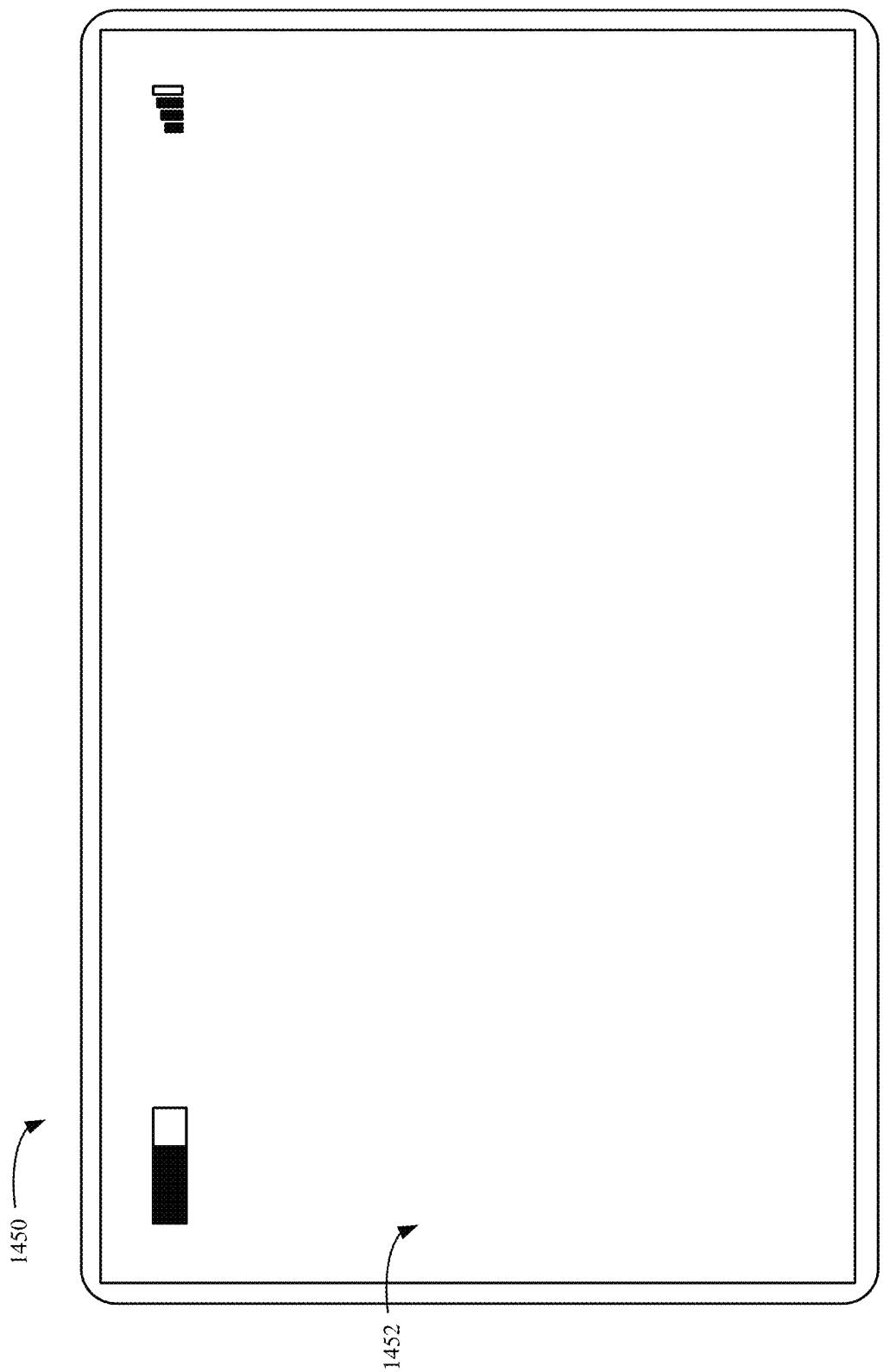
FIG. 30 illustrates an example of a handheld or mobile device.

FIG. 29 is a simplified block diagram of one example of a client device 1400, such as a handheld or mobile device, in which the present system (or parts of the present system) can be deployed. FIG. 30 illustrates an example of a handheld or mobile device.

One or more communication links 1402 allows device 1400 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1404. Interface 1404 and communication links 1402 communicate with one or more processors 1406 (which can include processors or servers described with respect to the figures) along a communication bus (not shown in FIG. 29), that can also be connected to memory 1408 and input/output (I/O) components 1410, as well as clock 1412 and a location system 1414.

Components 1410 facilitate input and output operations for device 1400, and can include input components such as microphones, touch screens, buttons, touch sensors, optical sensors, proximity sensors, orientation sensors, accelerometers. Components 1410 can include output components such as a display device, a speaker, and or a printer port.

Clock 1412 includes, in one example, a real time clock component that outputs a time and date, and can provide timing functions for processor 1406. Location system 1414 outputs a current geographic location of device 1400 and can includes a global positioning system (GPS) receiver, a LORAN system, a dead reckoning system, a cellular triangulation system, or other positioning system. Memory 1408 stores an operating system 1416, network applications and corresponding configuration settings 1418, communication configuration settings 1420, communication drivers 1422, and can include other items 1424. Examples of memory 1408 include types of tangible volatile and non-volatile computer-readable memory devices. Memory 1408 can also include computer storage media that stores computer readable instructions that, when executed by processor 1406, cause the processor to perform computer-implemented steps or functions according to the instructions. Processor 1406 can be activated by other components to facilitate functionality of those components as well.

FIG. 30 illustrates one example of a tablet computer 1450 having a display screen 1452, such as a touch screen or a stylus or pen-enabled interface. Screen 1452 can also provide a virtual keyboard and/or can be attached to a keyboard or other user input device through a mechanism, such as a wired or wireless link. Alternatively, or in addition, computer 1450 can receive voice inputs.

Figure 31:
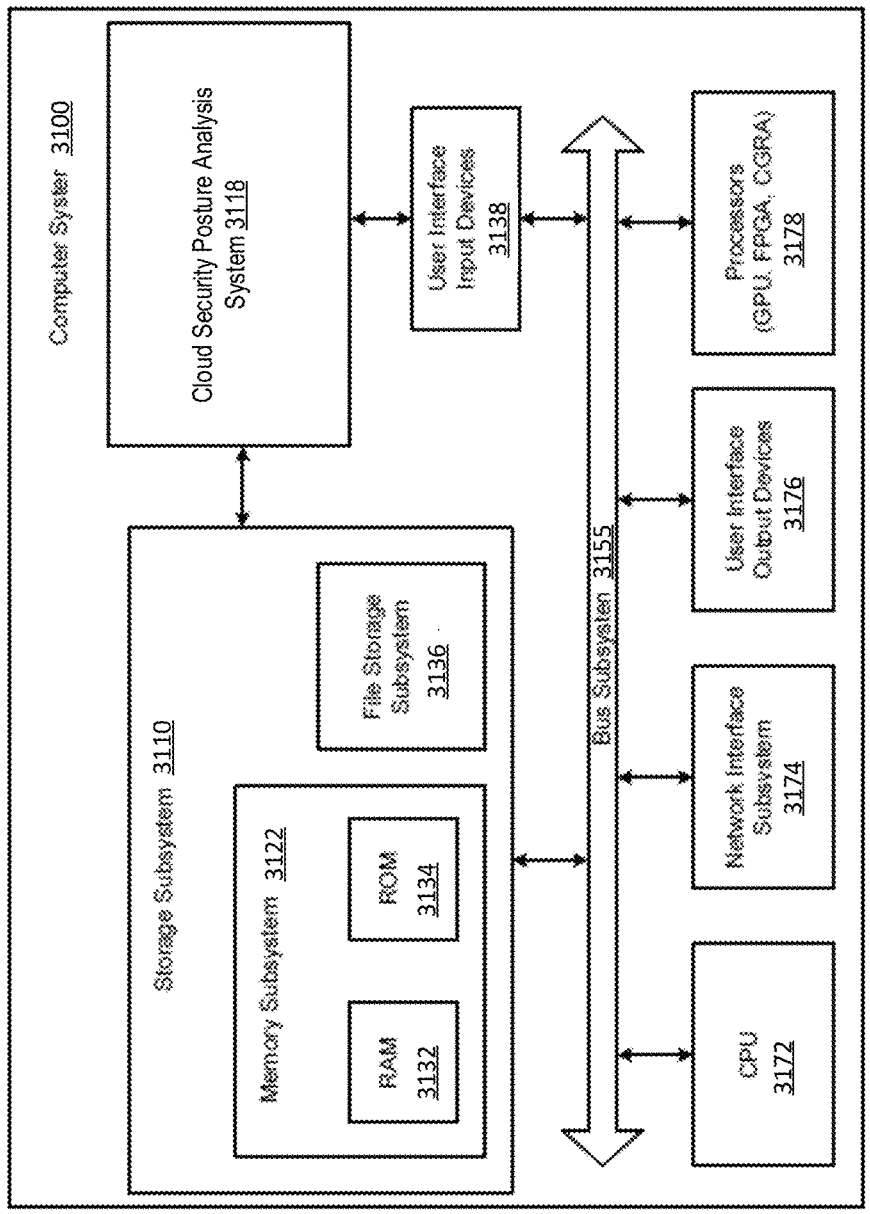
FIG. 31 shows an example computer system.

FIG. 31 shows an example computer system 3100 that can be used to implement the technology disclosed. Computer system 3100 includes at least one central processing unit (CPU) 3172 that communicates with a number of peripheral devices via bus subsystem 3155. These peripheral devices can include a storage subsystem 3110 including, for example, memory devices and a file storage subsystem 3136, user interface input devices 3138, user interface output devices 3176, and a network interface subsystem 3174. The input and output devices allow user interaction with computer system 3100. Network interface subsystem 3174 provides an interface to outside networks, including an interface to corresponding interface devices in other computer systems.

In one implementation, cloud security posture analysis system 3118 is communicably linked to the storage subsystem 3110 and the user interface input devices 3138.

User interface input devices 3138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 3100.

User interface output devices 3176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 3100 to the user or to another machine or computer system.

Storage subsystem 3110 stores programming and data constructs that provide the functionality of some or all of the modules and methods described herein. These software modules are generally executed by processors 3178.

Processors 3178 can be graphics processing units (GPUs), field-programmable gate arrays (FPGAs), application-specific integrated circuits (ASICs), and/or coarse-grained reconfigurable architectures (CGRAs). Processors 3178 can be hosted by a deep learning cloud platform such as Google Cloud Platform™, Xilinx™, and Cirrascale™ Examples of processors 3178 include Google's Tensor Processing Unit (TPU)™, rackmount solutions like GX4 Rackmount Series™, GX50 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 3122 used in the storage subsystem 3110 can include a number of memories including a main random access memory (RAM) 3132 for storage of instructions and data during program execution and a read only memory (ROM) 3134 in which fixed instructions are stored. A file storage subsystem 3136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 3136 in the storage subsystem 3110, or in other machines accessible by the processor.

Bus subsystem 3155 provides a mechanism for letting the various components and subsystems of computer system 3100 communicate with each other as intended. Although bus subsystem 3155 is shown schematically as a single bus, alternative implementations of the bus subsystem can use multiple busses.

Computer system 3100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 3100 depicted in FIG. 31 is intended only as a specific example for purposes of illustrating the preferred implementations of the present invention. Many other configurations of computer system 3100 are possible having more or less components than the computer system depicted in FIG. 31.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for analyzing security posture of a cloud environment, the computer-implemented method comprising:
    generating a graphical user interface having one or more user input mechanisms;
    based on user input through the one or more user input mechanisms, adding a first node element to the graphical user interface and defining a first entity in the cloud environment represented by the first node element, the first entity comprising at least one of:
        a cloud account, a compute resource, a storage resource, or a role;
    defining an edge element representing a relationship between the first entity and a second entity in the cloud environment that is represented by a second node element, the relationship comprising at least one of permissions data or access control data;
    defining a subject path signature in the cloud environment based on the first node element, the second node element, and the edge element;
    generating a query representing the subject path signature;
    executing the query to qualify a set of network paths in the cloud environment as conforming to the subject path signature; and
    outputting query results identifying the qualified set of network paths.

2. The computer-implemented method of claim 1, wherein executing the query comprises executing the query to qualify one or more compute resources or storage resources as vulnerable to breach attack.

3. The computer-implemented method of claim 2, wherein outputting query results comprises generating a representation of propagation of breach attack along the network paths.

4. The computer-implemented method of claim 1, wherein one or more node elements of the first node element or the second node element comprise configurable variables that define a type of network path for the subject path signature.

5. The computer-implemented method of claim 1, and further comprising a set of return data fields that define properties of the first and second entities to return in response to the query.

6. The computer-implemented method of claim 5, and further comprising:
    a query preview display pane configured to display one or more of the set of return data fields or the generated query.

7. The computer-implemented method of claim 1, wherein the first node element includes a filter mechanism configured to receive user input defining a filter criterion relative to the first entity represented by the first node element.

8. The computer-implemented method of claim 1, and the edge element comprise a visual link between the first and second node elements on the graphical user interface.

9. A computing system comprising:
  at least one processor; and
  memory storing instructions executable by the at least one processor, wherein the instructions, when executed, cause the computing system to:
    generate a graphical user interface having one or more user input mechanisms;
    based on to user input through the one or more user input mechanisms, adding a first node element to the graphical user interface and defining a first entity in a cloud environment represented by the first node element;
    define an edge element representing a relationship between the first entity and a second entity in the cloud environment that is represented by a second node element;
    define a subject path signature in the cloud environment based on the first node element, the second node element, and the edge element;
    generate a query representing the subject path signature;
    execute the query to qualify a set of network paths in the cloud environment as conforming to the subject path signature; and
    output query results identifying the qualified set of network paths.

10. The computing system of claim 9, wherein the instructions, when executed, cause the computing system to execute the query to qualify one or more compute resources or storage resources as vulnerable to breach attack.

11. The computing system of claim 10, wherein the instructions, when executed, cause the computing system to generate a representation of propagation of breach attack along the network paths.

12. The computing system of claim 9, wherein one or more node elements of the first node element or the second node element comprise configurable variables that define a type of network path for the subject path signature.

13. The computing system of claim 9, wherein the instructions, when executed, cause the computing system to generate a set of return data fields that define properties of the first and second entities to return in response to the query.

14. The computing system of claim 13, wherein the instructions, when executed, cause the computing system to:
  generate a query preview display pane configured to display one or more of the set of return data fields or the generated query.

15. The computing system of claim 9, wherein the first and second entities comprise one or more of:
  cloud accounts, compute resources, storage resources, or roles; and
  the relationship comprising at least one of permissions data or access control data.

16. The computing system of claim 9, wherein the first node element includes a filter mechanism configured to receive user input defining a filter criterion relative to the first entity represented by the first node element.

17. A computing system comprising:
  memory storing permissions data and access control data for pairs of compute resources and storage resources in a cloud environment;
  accumulation logic configured to trace network paths between the compute resources and the storage resources based on the permissions data and the access control data;
  graphical user interface generator logic configured to:
    generate a graphical user interface having one or more user input mechanisms;
    based on to user input through the one or more user input mechanisms, adding a first node element to the graphical user interface and defining a first entity in the cloud environment represented by the first node element;
    define an edge element representing a relationship between the first entity and a second entity in the cloud environment that is represented by a second node element, the relationship comprising at least one of permissions data or access control data; and
    define a subject path signature in the cloud environment based on the first node element, the second node element, and the edge element;
  query generator logic configured to generate a query representing the subject path signature; and
  query execution logic configured to:
    execute the query to qualify a set of network paths in the cloud environment as conforming to the subject path signature; and
    output query results identifying the qualified set of network paths.

18. The computing system of claim 17, wherein the graphical user interface generator logic is configured to generate a query preview display pane configured to display one or more of a set of return data fields or the generated query.

19. The computing system of claim 17, and further comprising:
  a filter mechanism configured to receive user input defining a filter criterion relative to the first entity represented by the first given node display element.

* * * * *